United States Patent [19]

Schmidt et al.

[11] 3,778,715

[45] Dec. 11, 1973

[54] TDMA SATELLITE COMMUNICATIONS SYSTEM WITH RAPID AUTOMATIC RE-ENTRY FOLLOWING BRIEF OUTAGES OF EARTH STATION EQUIPMENT

[75] Inventors: William G. Schmidt, Rockville; Ova G. Gabbard, Germantown, both of Md.; John M. Husted, Vienna, Va.; Wilfrid G. Maillet, Oxon Hill, Md.

[73] Assignee: Communication Satellite Corporation, Washington, D.C.

[22] Filed: Aug. 11, 1971

[21] Appl. No.: 170,930

[52] U.S. Cl. .................... 325/2, 325/4, 179/15 BS
[51] Int. Cl. .................... H04b 7/20
[58] Field of Search .................... 325/2, 4, 31, 58; 179/15 AE, 15 BF, 15 BS; 178/69.5 R; 340/214, 147 SY, 147 LP

[56] References Cited

UNITED STATES PATENTS 3,641,274 2/1972 Sasaki .................... 179/15 BS

*Primary Examiner*—Benedict V. Safourek
*Attorney*—Richard C. Sughrue et al.

[57] ABSTRACT

In a satellite transponder communications system operating in a time division multiple access mode, each earth station transmits data in a burst format. All bursts within a single transponder frame are synchronized to a special burst which contains no data communications. A single earth station sends out the reference burst as well as its normal burst and in the case of multi transponders and multi transponder frames, the single reference station sends out all of the reference bursts for the various transponder frames. Data to be transmitted may be received in many different forms and included within the same burst because of the modular arrangement of the earth stations. Individual terrestrial interface modules receive data in various forms, convert the data into bit form which is compatible with the TDMA system, store the converted bit stream and hold the block of data until a multiplexer requests the block of data for inclusion into the earth station's transmitted burst. The arrangement of blocks of data within a burst and the timing and duration of a burst is controlled by digital words stored in a memory. Complete reordering of burst times and the arrangement of blocks of data within a burst is accomplished by changing the words stored in the memory. A comparable system on the receive side of the earth station extracts blocks of data in selected bursts for conveyance to selected terrestrial interface modules. Loss of synchronization at an earth station due to short time transmission interruptions is compensated for by predicting the correct burst transmission time following the end of said interruption.

5 Claims, 27 Drawing Figures

*INVENTORS*

WILLIAM G. SCHMIDT, OVA G. GABBARD,
JOHN M. HUSTED, WILFRID G. MAILLET

BY Sughrue, Rothwell, Mion, Zinn & Macpeak

*ATTORNEYS*

PATENTED DEC 11 1973 3,778,715

SHEET 03 OF 21

TDMA SATELLITE COMMUNICATIONS SYSTEM WITH RAPID AUTOMATIC RE-ENTRY FOLLOWING BRIEF OUTAGES OF EARTH STATION EQUIPMENT

BACKGROUND OF THE INVENTION

In a TDMA satellite communications network multiple stations transmit data via the satellite in a non-overlapping time sequence. The period of transmission is known as the transmission burst of the earth station, and the bursts of all earth stations are synchronized to the TDMA frame reference signal so that they arrive at the satellite in a specified order. The problem of either initially finding the correct burst transmission time for an earth station and the problem of re-establishing synchronization once it has been lost is typically handled by acquisition means at the earth station. During the acquisition mode the normal burst transmission is stopped and an acquisition signal is sent out having a phase which is related to the start time of burst time transmission. On the receive side of the earth station the phase of the received acquisition signal is compared with the time of reception of the frame reference and the phase of the transmitted acquisition signal is altered until the phase of the received acquisition signal is at the proper position relative to the received frame reference. The time required for acquisition is in the neighborhood of 1½ minutes.

SUMMARY OF THE INVENTION

In accordance with the present invention rapid re-entry means are provided for placing the earth station back in synchronization following brief transmission interruptions. The rapid re-entry is based upon the predictability of the time separation between the received frame reference and the initiation of the station's burst. Normally, the latter time separation is the function which is controlled and altered by the burst synchronizer to maintain the necessary burst synchronization. The burst synchronizer monitors the time separation between the received frame reference signal and the received station's own burst and alters the time separation between the received reference and the initiation of burst transmission. Due to movement of the satellite relative to the earth station, the time separation between received reference and start of transmission will vary. In accordance with the present invention the time separation between received frame reference and the start of burst is periodically monitored and the rate of change of said time separation is calculated. Following a short term transmission interruption, the last monitored time separation and the last calculated rate are mathematically combined with the measured time interruption to calculate a predicted time separation for the instant that the power returns. The predicted time separation is used to determine the time for transmitting the station burst.

Re-entry of the transmitting station's burst into the proper position is required after any outage. An outage may be due to a power transient or power loss, problems in antenna tracking, equipment switchover, etc. An outage time of 30 to 50 seconds is suggested as the transition time between rapid re-entry and normal automatic acquisition. It is possible to extend this transition interval to several minutes, but the primary justification for a fast re-entry system is to restore service after short outages without dropping voice calls. Voice calls will typically be dropped if an outage lasts longer than 30 to 50 seconds.

DETAILED DESCRIPTION OF DRAWINGS

This case contains substantially the same disclosure as the following companion cases: Ser. No. and Filing Dates: 170,796 Aug. 11, 1971; 170,929 Aug. 11, 1971; 170,797 Aug. 11, 1971; 170,931 Aug. 11, 1971; 170,933 Aug. 11, 1971; 170,932 Aug. 11, 1971.

Figure 1:
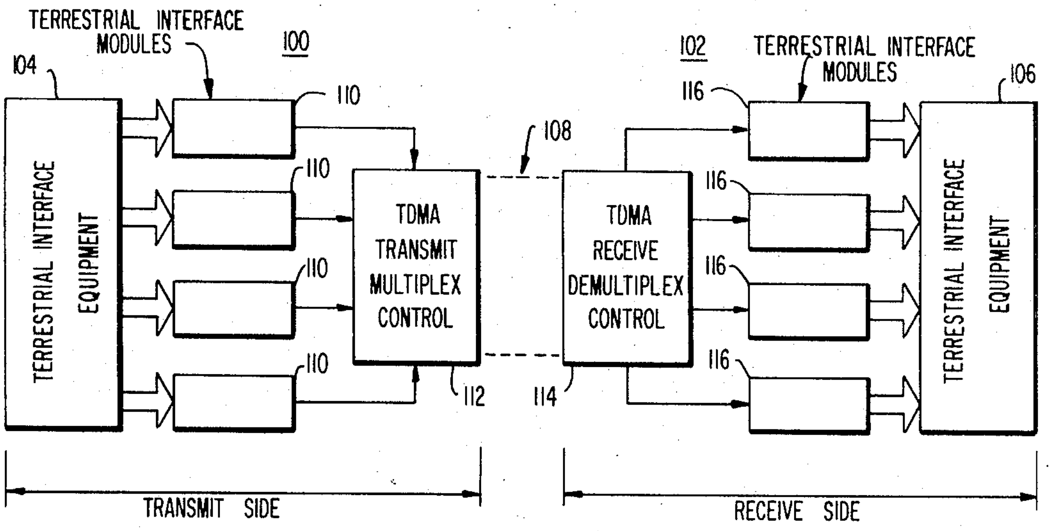
FIG. 1 is a general block diagram of a TDMA system.

A simplified block diagram of a satellite TDMA (Time Division Multiple Access) system is illustrated in FIG. 1. The equipment which is on the transmit side is shown generally at 100 and the equipment on the receiving side is shown generally at 102. The transmission medium 108 is intended to include a satellite transponder. As will be appreciated by anyone familar with the satellite communications art, an earth station including transmit equipment would also include receive equipment. However, for ease of understanding the transmission equipment only is shown at one terminal and the receiver equipment only is shown at another terminal.

The terrestrial interface equipment 104 and 106 are not typically part of any earth station but represent the systems which convey signals for transmission to and which receive signals transmitted from distant earth stations. The means for deriving signals to be transmitted via a satellite transponder forms no part of the subject TDMA system. The signals may be voice signals, data signals, video signals, etc. The only requirement is that the signals to be transmitted must be capable of being converted into bit streams at the input rate of the TDMA system.

The TDMA system disclosed herein is a modular system. That is, it is comprised of building blocks which enable the system to be built at relatively low cost and added onto in future years. The transmit side includes a number of modules 110 which are known as terrestrial interface modules (TIMs). The TIMs are basically signal conversion devices and the particular form of TIM depends upon the form of signal received from the terrestrial interface equipment. For example, if single channel voice information is the input to a particular TIM, the TIM must be a system which is capable of sampling the voice data, converting the samples into codes and presenting digital data in a form ready for transmission by the TDMA transmission side. If the input to a TIM is multiple analogue channels, then the TIM must have the additional capability of multiplexing the input analogue signals as well as sampling and converting each sample into a code. There are three basic types of TIM modules dependent upon the class of input signal entering the modules. These are voice-frequency interface modules, FDM interface modules, and direct digital interface modules. Individual apparatus for converting input signals of the type described into digital signals which may be handled by the TDMA transmit equipment are known in the art. One feature which must be added to known systems so that they will become suitable TIM units for use in the described TDMA system is compression/expansion buffers. Compression buffers are needed at the transmit side and expansion buffers are needed at the receive side. Although the use of compression/expansion buffers is not in itself novel, it is novel to have separate TIM units, each with its own compression/expansion buffer.

As indicated above, each TIM receives signals in a form which is not controlled by the earth station system. For example, in many cases the form of the signal received will be the form which the telephone company desires to transmit to the earth station for processing. Voice channels are typical of the type of input signals. As explained above the TIM converts the input voice channel signals into a bit stream representing the input signals. However, the bit stream is continuous whereas the earth station and the TDMA system is allowed to transmit only during finite periods of time, hereinafter referred to as the burst time for the particular earth station. Furthermore, since there are many TIM units involved at a single earth station, each burst time for the earth station is sub-divided into time separated sub-bursts. Consequently, the bit stream in the TIM must be compressed and transmitted only during the sub-burst time which is allocated to the particular TIM. This compression is accomplished by the compression buffer. Basically, the entire contents of a bit stream occurring during a single TDMA frame period is stored in a memory portion of the compression buffer. When the next sub-burst time for the particular TIM occurs the stored bit stream is read out at a rate which is sufficient to transmit the entire bit stream via the TDMA transmission equipment during the sub-burst time.

Figure 2:
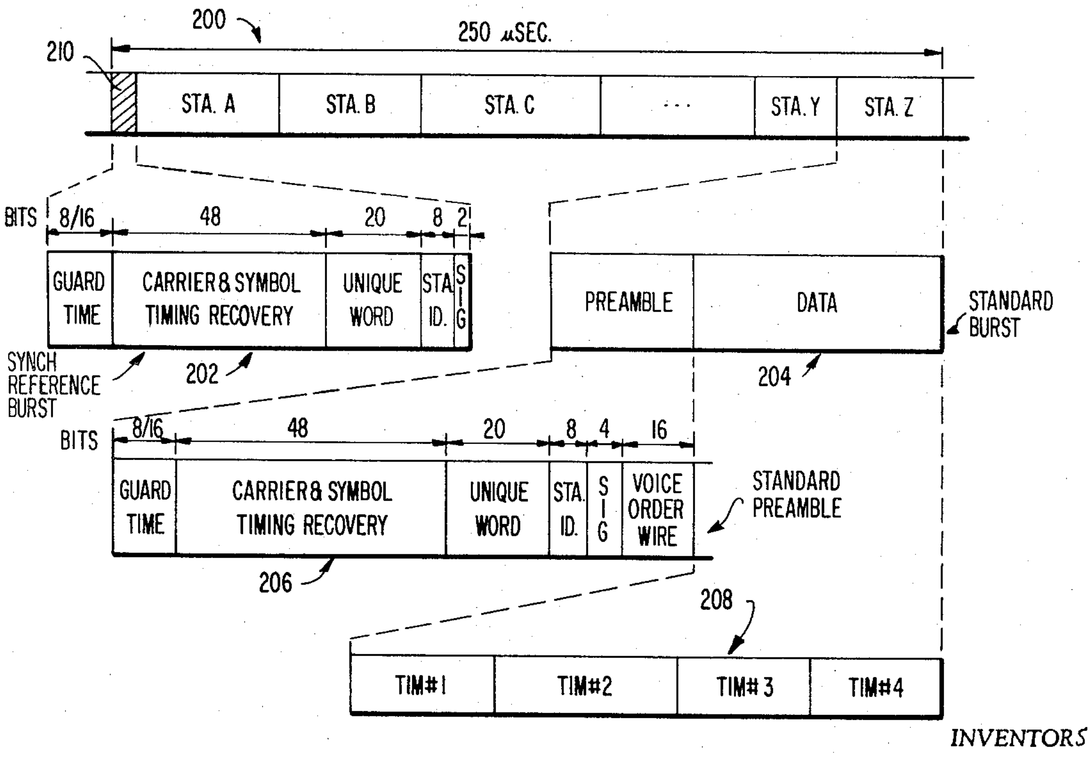
FIG. 2 illustrates the frame and burst formats for the system shown in FIG. 1.

A better understanding of the relationship between frame rate, bursts, and sub-bursts can be had by referring to FIG. 2 wherein the numeral 200 represents a frame of the TDMA system. In the specific example described herein it is assumed that a TDMA frame is 250 microseconds and there are Z stations participating in the TDMA system. As is well known, in TDMA each staton transmits a burst of information at a time synchronized with all other stations such that the bursts from all stations in the system will be received at the satellite transponder in non-overlapping time sequences. Typically, each station will send one burst per frame.

The format of a typical station burst is shown by numeral 204 as comprising a preamble followed by a data portion. In the context used herein, data refers to subscriber information which is to be sent at the request of subscribers, whereas the preamble includes signaling, synchronization and housekeeping information. For the particular example described herein the bit rate of the TDMA system will be assumed to be 60 megabits per second. Transmission is assumed to be four phase PSK and consequently the symbol rate is 30 megabits or megasymbols per second. (As is well known in four phase PSK a symbol comprises two bits which are transmitted simultaneously).

An example of a preamble for any given earth station is illustrated at 206 in FIG. 2. The first 8 to 16 bit spaces are taken up by guard time which is simply a short period of non transmission required to insure no overlap between adjacent station bursts. This is followed by 48 bits of carrier and symbol timing recovery as is well known in the art. A 20 bit unique word follows for synchronizing the receivers. In many systems proposed in the prior art a different unique word is sent from each station. However, in the specific example described herein the 20 bit unique words sent in the preamble of all regular station bursts are identical. In order to identify the individual station which is sending the burst, an 8 bit station identification code follows the 20 bit unique word. The station identification code is followed by 20 bits which are used for internal signaling and housekeeping functions. The use of this space for signaling and housekeeping functions is well known in the art and will not be discussed in any detail herein. The preamble of the regular burst is followed by the data portion of the burst. Unlike systems proposed in the prior art, the data portion of the burst, as shown at 208, is divided into sub-bursts. Each sub-burst contains data taken from a TIM module. For the example shown at 208 in FIG. 2 it is assumed there are four TIM modules at station Z.

In referring to the unique word above, it was pointed out that the 20 bit unique word is the same for all stations in the "regular" bursts. The term regular is used herein to differentiate between a station burst which contains data and a station burst which is used solely as a frame reference. In systems proposed in the prior art, the regular burst from one of the stations, e.g. station A, additionally served the function of a frame reference. That is, all of the other stations synchronized their burst times to the station A unique word. Although this has the advantage of conservation of transmission time, it presents difficulties when there is a power failure at station A or for any other reason station A goes off the air. In the prior systems, when the reference station ceases transmitting, a secondary reference station must take over and the latter station's regular burst must become the reference burst. However, when the secondary station, e.g. station B, uses its regular burst as the reference burst all other stations within the TDMA network must move their burst times relative to the new reference since the position of the frame reference relative to these stations has now changed. There are now a number of problems encountered in the movement of the bursts.

In the specific example described herein these problems are overcome by transmitting a special burst which serves as a reference burst and which does not include a data portion. The reference burst is shown diagramatically at 210 in FIG. 2. The reference burst may be sent by station A with stations B and C being secondary reference stations having the capability of sending out the reference burst if the power of station A fails. However, unlike the prior art systems, if for some reason station A fails even though a new station must take over the reference function, the reference burst is sent at the same relative time within the frame so that none of the regular bursts from the participating stations need be adjusted. The format for the reference bursts is shown at 202 and comprises 48 bits of carrier and symbol timing recovery, a 20 bit reference unique word which is different from the regular unique word, an eight bit station identification code, and 2 bits of signaling.

Referring back to FIG. 1, the TDMA transmit and multiplex control unit 112 controls the formatting of the burst for the station. The advantage of the modular concept is that as far as the unit 112 is concerned the form of the signals at the TIM inputs are irrelevant. The unit 112 merely looks at each TIM as a separate storage means which stores a separate block of data. At the sub-burst time assigned by the unit 112 to a TIM module 110, the unit 112 extracts the block of data from the TIM and transmits it through the TDMA system during the assigned sub-burst time. On the receive side the unit 114 and TIM modules 116 operate in a manner opposite to that of unit 112 and TIM modules 110. In unit 114, the sub-bursts are extracted and sent to the respective TIM units 116 in accordance with prearrangement. As in the case of the transmit portions of the TIM units 110 the receive portions of the TIM units 116 may be of various different types for the purpose of converting the received sub-groups into continuous signals of various form, e.g., voice, TV, digital data. An expansion buffer in each TIM 116 performs the reverse function of the compression buffer in the TIM units 110.

The TDMA equipment at each earth station includes three basic sub-systems which are referred to as the transmit side sub-system, the receive side sub-system, and the control sub-system. Very generally, the transmit side sub-system extracts the data blocks from the TIM units at the proper sub-burst times, adds the preamble information, and transmits the entire station burst at the appropriate time. The receive side subsystem receives all station bursts via the transponder, extracts the data destined for the local earth station, separates the sub-bursts in the received data, and sends the sub-bursts to the appropriate TIM units. The common control sub-system operates to maintain the station burst at the proper position and in synchronism with the TDMA frame reference, provides for burst acquisition when synchronization is lost or when the station is first entering the frame, and provides other housekeeping and signaling functions.

Figure 4:
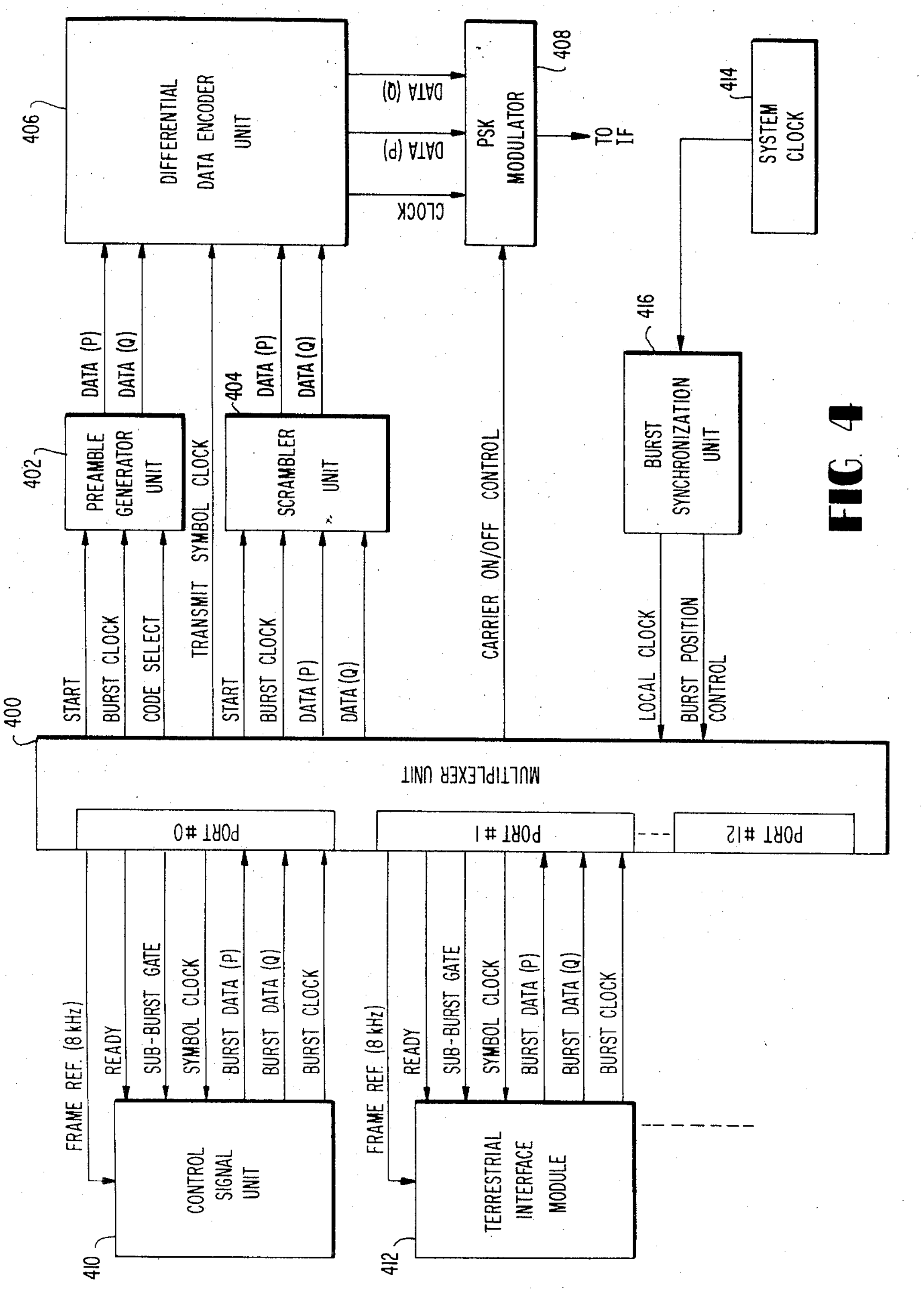
FIG. 4 is a block diagram of the transmit side subsystem of an earth station.

A general block diagram of the transmit side subsystem with connection to other elements is illustrated in FIG. 4 and comprises a multiplexer unit 400, a preamble generator unit 402, a scrambler unit 404, a differential data encoder unit 406, and a PSK modulator 408. The output from the PSK modulator 408 is a stream of four phase PSK modulated IF, which is sent to an up convertor which converts the four phase PSK IF into the proper up-link transponder frequency for transmission to the satellite. The PSK modulator is turned on at the beginning of the burst and turned off at the end of the burst under control of a burst synchronization unit 416 which is part of the common control sub-system and which will be explained in more detail hereafter. The burst synchronization unit 416 is under the control of a system clock 414. The multiplexer unit 400 is illustrated as having 13 ports, 0–12, for accommodating 12 TIM units 412 and one control signal unit 410. The control signal unit is a system known in the prior art and is part of the common control sub-system. As far as the multiplexer unit is concerned the control signal unit 410 looks just like another TIM unit since it merely presents a block of bits ready for selection at the command of the multiplexer unit. However, unlike the TIM units, the block of bits presented by the control signal unit comprises the signaling information referred to above.

Since the system described in the example is a four phase PSK system, all transmission of bits is via two channels, hereinafter designated, respectively, as the P and Q channels. The burst synchronization unit 416 sends a start signal to the multiplexer unit 400 along with a local clock at the symbol rate of 30 mega bits per second. At the start of the burst transmission time, the multiplexer unit initiates the preamble generator unit 402 which will be described in more detail in connection with FIG. 5. Basically, the preamble generator unit 402 generates the carrier and symbol recovery timing as well as the regular or reference unique word. A preamble generator unit is somewhat a misnomer because it generates only a portion of what is commonly referred to as the preamble. Referring back to FIG. 2, numeral 206 indicates that the preamble includes the carrier and symbol timing recovery, the 20 bit unique word, plus an additional 28 bits (14 symbols) of station identification signaling and housekeeping functions. However, the latter 28 bits are not generated by the preamble generator unit 402 but instead come from the control signal unit. For the present purpose it is sufficient to understand that the station identification code and the other signaling and housekeeping data is stored as a block in the control signal unit ready for extraction by the multiplexer unit. When the last symbol of the unique word has been generated by the preamble generator unit 402, multiplexer unit 400 sends a sub-burst gate and a symbol clock to the control signal unit 410. During the duration of the sub-burst gate, the block of bits in the control signal unit passes through to the scrambler unit 404. As previously described, this data appears on the P and Q channels. The symbol clock also appears at the output of the control signal unit as the burst clock and is also applied to the scrambler unit. The TIM units 412 are controlled in exactly the same way. That is, at the proper respective times a sub-burst gate and the symbol clock are applied to the respective TIM unit causing a read out of the respective P and Q channels of data along with the burst clock. This data and clock is applied through to the scrambler unit. As illustrated in the figure, each TIM 412 and the control signal 410 also receive a frame reference signal and a ready signal. The frame reference signal is the same for all TIMS and the control signal unit 410 and merely synchronizes the units 412 and 410 to the TDMA frame. This is necessary since the data extracted from any given TIM unit during a single sub-burst corresponds to the data received and converted by the TIM unit during the entire previous frame. The frame reference signals consequently are used to segregate the data bits in the TIM into individual blocks for transmission during a single sub-burst. The ready signals are merely warning signals to the units 412 and 410 which occur eight symbols in advance of the start of the sub-burst gate for the respective unit 410 or 412. The sub-burst gates occur sequentially and consequently the blocks of data from the respective TIM units will appear at the input of the scrambler unit 404 in preassigned non-overlapping sequence. The scrambler unit 404 is a known device and its purpose is to impart a more nearly random nature to the transmitted bit stream thus providing a more evenly distributed power spectrum at the PSK modulator (408) output. Essentially, the scrambler unit comprises a pseudo-random code generator for generating a long pseudo-random bit code and an exclusive OR circuit for adding the pseudo-random code modulo-2 to the input data. The reverse of the scrambler unit, a descrambler unit appears at the receive side.

The data from the preamble generator unit 402 and the scrambler unit 404 are applied to the differential data encoder unit 406. This also is a known device. The purpose of the differential data encoder unit is to add coding to the data channels to distinguish the P channel from the Q channel. In the absence of a unit serving this purpose, a receiver could mix up the P and Q channels.

Figure 5:
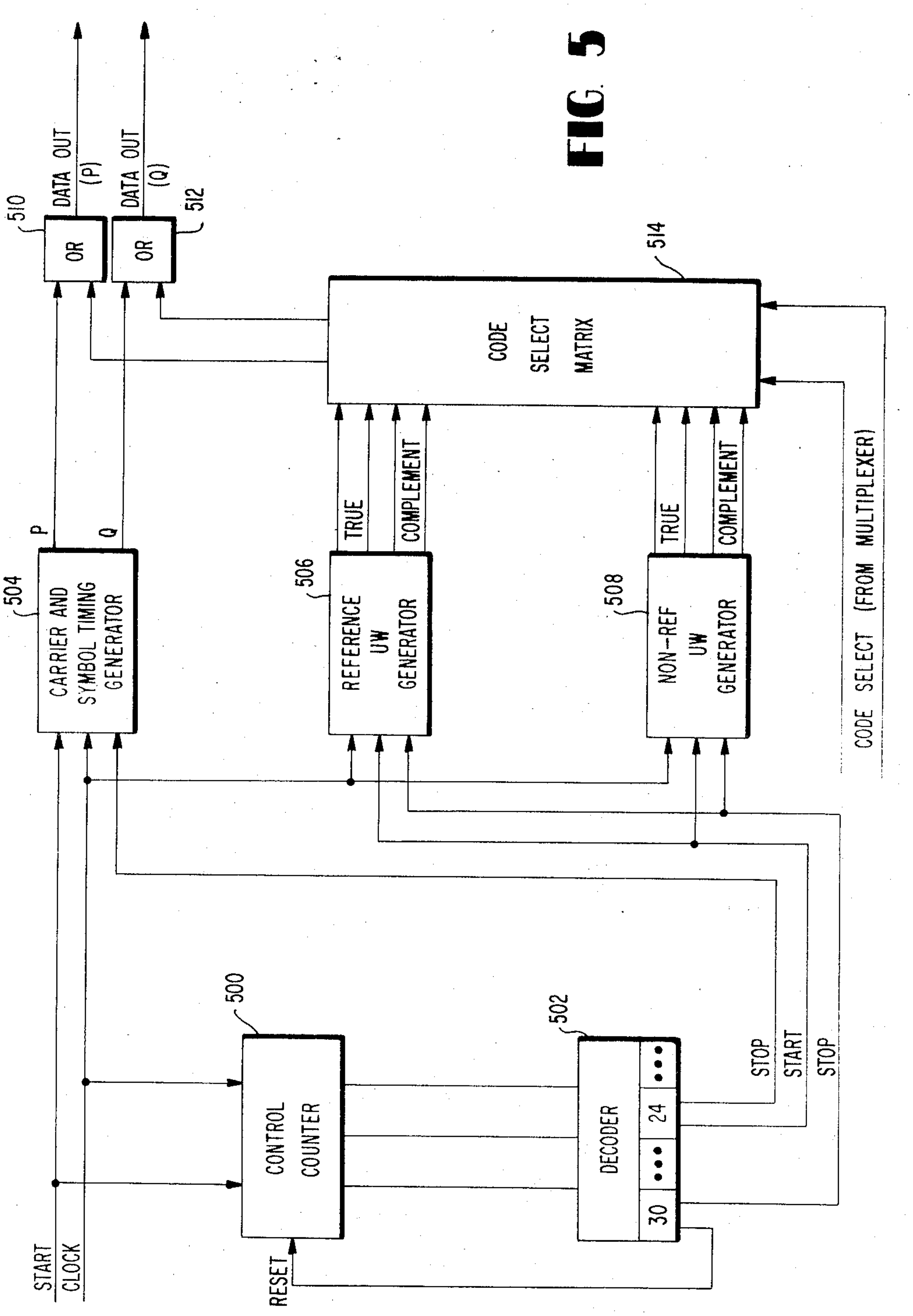
FIG. 5 is a block diagram of a preamble generator which forms a part of the transmit side subsystem.

An example of a preamble generator is shown in FIG. 5 and comprises a control counter 500, a decoder 502, a carrier and symbol timing generator 504, unique word generator 506 and 508, code select matrix 514, and OR gates 510 and 512. As pointed out above, the preamble generator generates 48 bits (24 symbols) of carrier and symbol timing followed by a 20 bit (10 symbol) unique word. For those stations which may serve as the reference station, there are four possible 20 bit unique words which may be generated. For those stations which are not equipped to serve as the reference station, there are only two possible unique words which may be generated. The block diagram in FIG. 5 includes apparatus for generating the reference unique word. Of the four possible 20 bit unique words, two are considered primary and two are considered secondary. The first primary unique word is the reference unique word which has been referred to above. The reference unique word nominally appears in every reference burst transmitted from the reference station. We say it nominally appears because, periodically, the complement of the reference unique word is substituted for the reference unique word in the reference burst. The complement of the reference unique word is one of the two secondary unique words and its purpose will be explained subsequently. For the present, it is sufficient to understand that it is used to assign separate acquisition times to the various earth stations in the TDMA system.

The second primary unique word is the non-reference or regular unique word which nominally appears in every regular station burst. The remaining unique word is the complement of the regular unique word. This is substituted for the regular unique word in the regular station burst once every 32 frames. The complement of the regular unique word serves as a reference for sub-multiplexing. For example, some of the housekeeping or signaling data may be sub-multiplexed over a pluarlity of frames e.g. 32 frames, and thus some means is needed for providing a reference for the sub-multiplexing.

The preamble generator operates in the following manner. In a response to a start pulse from the multiplexer, the generator 504 generates a predetermined 48 bit sequence which may, for example, be the sequence 1100110011 . . . etc. Timing of the generator 504 as well as the other generators in FIG. 5 is controlled by the symbol clock from the multiplexer. The sumbol clock is also counted by a counter 500 which cooperates with a decoder 502 for starting and stopping the individual units 504, 506, and 508. After the control counter recieves 24 symbol clocks, the decoder sends a stop pulse to the generator 504 and a start pulse to the unique generators 506 and 508. All four 20 bit unique words will be generated by unique word generators 506 and 508. The four unique words will be applied to a conventional type of code select matrix 514, which operates in response to code select control signals from the multiplexer to select only one of the four input unique words. The P and Q channels of the carrier and symbol timing are combined in OR gates 510 and 512 with the P and Q channels of the unique words to provide the P and Q outputs from the preamble generator. It will also be noted that when the control counter 500 has counted 34 symbols, a stop pulse will be applied to the unique word generator 506 and 508, and the control counter 500 will be reset.

Figure 6:
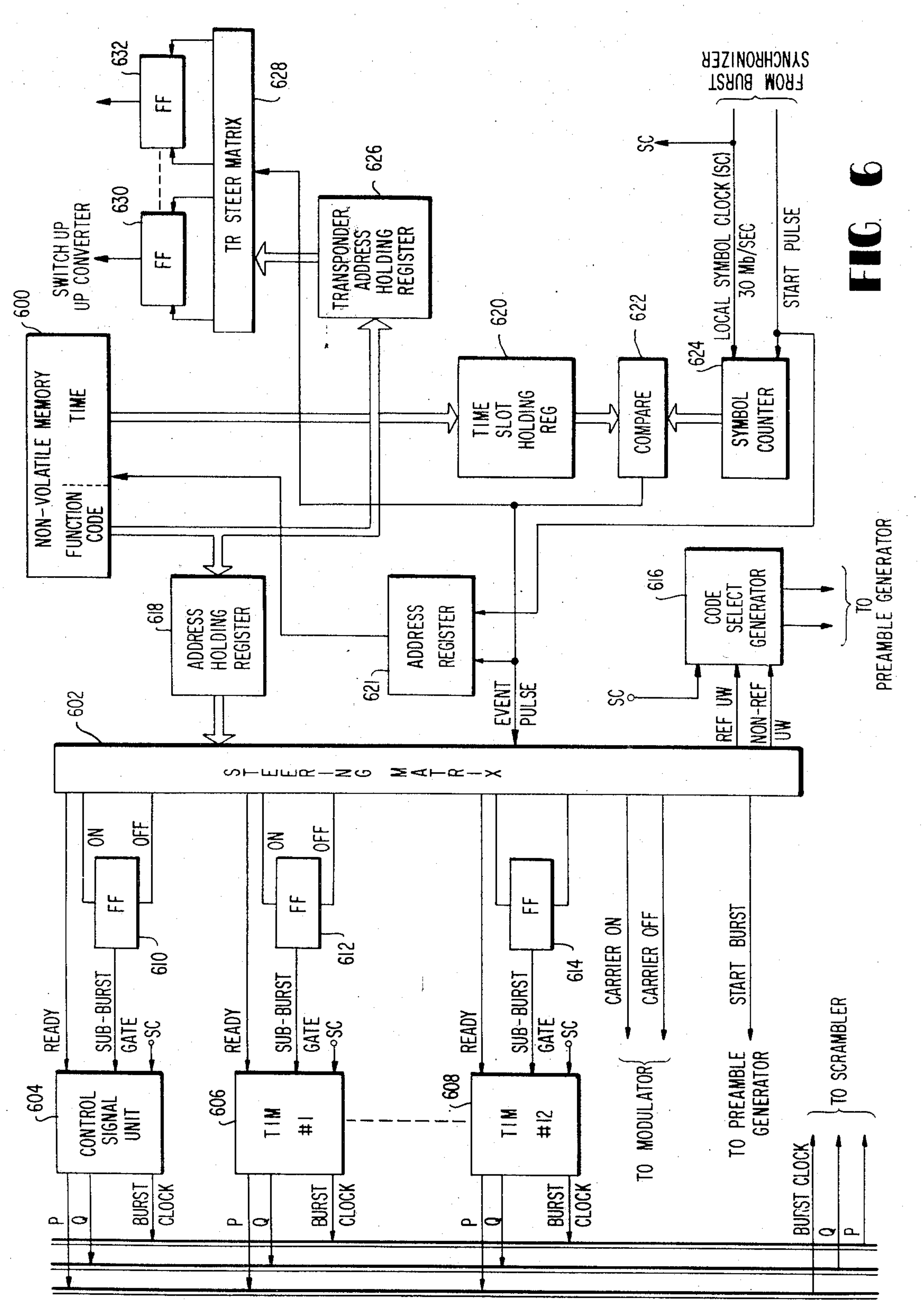
FIG. 6 is a block diagram of a multiplexer which forms a part of the transmit side subsystem.

A block diagram of a multiplexer suitable for use in the transmit side sub-system is illustrated in FIG. 6, along with a control signal unit and several TIM units. The multiplexer extracts the blocks of data presented to it by the TIM units and arranges the blocks in sub-bursts within the station burst. The sub-burst time for each block of TIM data relative to the start of the burst is a priori information. The multiplexer monitors time from the synchronized start pulse and during the appropriate known times starts and stops a sub-burst gate which is directed to a particular TIM unit. The multiplexer is very flexible because the timing of bursts and sub-bursts, the selection of unique words (and the frequency as will be described later) is under control of words stored in a memory.

The multiplexer in FIG. 6 includes a non-volatile memory 600 which stores multiple words therein and sequentially presents the stored words to output register 618 and 620 under control of an address register 621.

Each word contains two fields, a time field which defines the time at which a function is to be carried out, and a function code field which defines the function or functions to be carried out. Examples of functions are; gate on TIM#1, gate off TIM#1, turn carrier on, select reference unique word, turn on up converter#4, etc.

The words are stored in and read from the memory in the order that the functions are to be performed. The time period during which all memory words are read out is equal to the frame period, and said memory time period or recycle period begins with the synchronized start pulse from the burst synchronizer. The latter pulse resets a symbol counter 624 and clears address register 621. The first word is read out under control of the address register. The function code field is entered into the function holding register 618, and the time field is entered into the time slot holding register 620. The symbol counter counts the local symbol clock pulses, and compare means 622 provides an event pulse whenever the time field held in the register 620 equals the time accumulated by the symbol counter 622.

The event pulse then passes through a steering matrix 602 under control of the function code to one or more of the steering matrix output lines to initiate one or more of the functions. The steering matrix may be a conventional device which gates an input to one or more selected outputs under control of a code which operates gates within the matrix. The functions performed by the outputs are readily apparent. For example, the output pulse may read, start or stop the sending of a block of data from a TIM unit to the scrambler. The output pulse may turn on or off the modulator. The output pulse may signal the start of a burst by being applied to the preamble generator. The output pulse may also indicate whether the burst is to be a reference burst or a regular burst by its appearance on either of the two inputs to the code select generator 616.

The event pulse also steps the address register 621 thereby causing read out from memory 600 of the next word in the sequence. Thus it can be appreciated that the order of events at the transmitter can be completely revised by a mere reprogramming of the words stored in the memory 600. As will be seen later, comparable memories in the receive side sub-system allow the same flexibility in the selection and distribution of incoming bursts.

The code select generator 616 may be any simple device which provides a two bit output code to the preamble generator for selection of one of the four possible unique words. As an example, the generator 616 may include a pair of counters, one for the reference unique word and one for the non-reference unique word. When the matrix output 602 indicates reference unique word, the code generator puts out a fixed code, e.g. 00. However every Nth reference unique word received by the generator 616 results in a different code, e.g. 01, which represents the complement of the reference unique word. The same kind of code generation applies to the non-reference and complement of the non-reference unique words, except that N will not necessarily be the same for the reference and non-reference indications.

Figure 7:
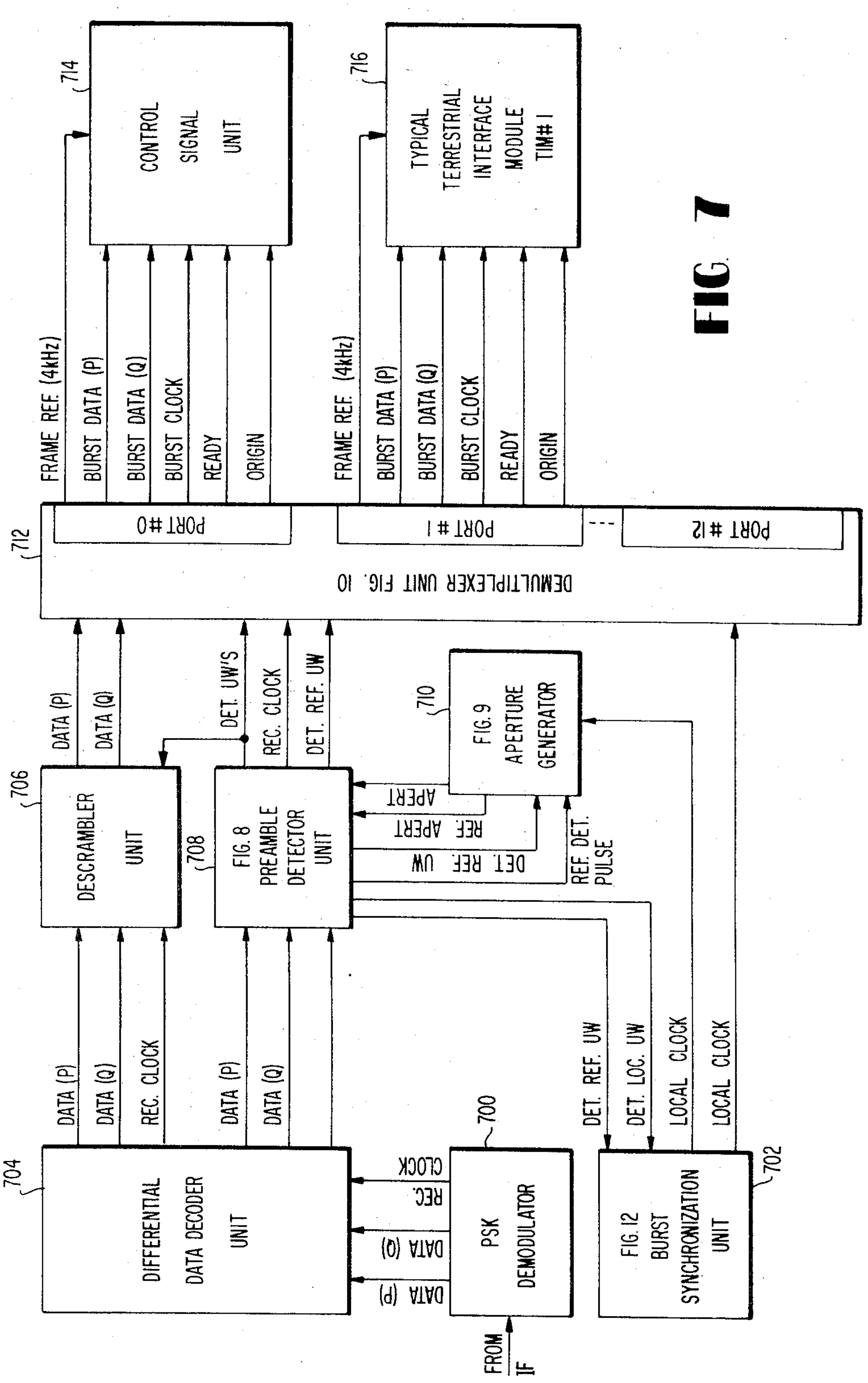
FIG. 7 is a block diagram of the receive side subsystem of the earth station.

A general block diagram of the receive side subsystem of the TDMA terminal is illustrated in FIG. 7. The signals received via the transponder on the satellite are applied, after being frequency down converted into an IF frequency, to the PSK demodulator 700. As is well known in the art, the PSK demodulator 700 recovers a clock signal from the incoming PSK modulated signals and also derives the P and Q data streams therefrom. The recovered clock as well as the P and Q data streams are applied to a differential decoder unit 704, which as is well known in the art, performs a function which is the complement of the function performed by the differential encoder unit at the transmit side of the sub-system. For every burst received, all symbols subsequent to the 20 bit unique word are descrambled by the descrambler unit 706 whose output is applied as an input to the demultiplexer unit 712. The descrambler unit 706 performs a function opposite to that of the scrambler unit in the transmit side sub-system. The data out of the differential data decoder unit 704 is also applied to the preamble detector unit 708 which is described in more detail in connection with FIG. 8. In general, the preamble detector unit operates to detect the four possible 20 bit unique words and to provide indications of the detection thereof to the descrambler unit 706, the demultiplexer unit 712, and the burst synchronization unit 702. It should be noted that the burst synchronization unit 702 is not considered as part of the receive side sub-system, but rather is part of the common control equipment. Details of the burst synchronization unit will be described in connection with FIG. 12.

The indication that a unique word has been detected by the preamble detector unit is also sent to an aperture generator 710 which will be described in more detail in connection with FIG. 9. For the present, it is sufficient to understand that the aperture generator provides a window or aperture to the preamble detector unit during which time the preamble detector unit 708 looks for the received unique words.

The demultiplexer unit 712, like the multiplexer unit in the transmit side sub-system, has 13 ports, 0–12, which communicate with one control signal unit 714 and 12 TIM units 716. The data input to the demultiplexer unit consists of the data in the bursts selected by the earth stations. The demultiplexer operates to extract designated bursts and sub-bursts, or portions thereof, and to apply the extracted portions to the proper TIM unit or control signal unit. In addition to applying the proper data to a particular TIM unit, the demultiplexer also provides a burst clock to the TIM for the duration of the data portion, a ready signal which precedes the data portion, and a frame reference signal. The details of the demultiplexer unit will be described in connection with FIG. 10.

The received P and Q data bit streams as well as the recovered clock are applied to a first pair of ten bit shift registers 800 and to a second pair of ten bit shift registers 810. The shift registers 800 continuously present their contents to a reference unique word correlator 802 which provides an output pulse or spike indicating the detection of either the true reference pulse or the complement of the true reference pulse. As seen in the drawing the output pulses corresponding to the two different unique words appear on different output lines.

The true and complement reference pulses are applied through OR gate 805 to the aperture generator, and through respective AND gates 804, 806 and OR gate 808 to the burst synchronizer. The latter AND gates are gated on by a reference aperture gate from the aperture generator. The output from AND gate 806 is additionally applied to an entry unit for the purpose of marking the beginning of an acquisition frame to be explained in more detail hereinafter. The aperture gate applied to the AND gates 804 and 806 is a narrow gate signal, seven symbols wide, and is generated and made coincident in time with the expected location of the detection pulses or spikes from the reference unique word correlator 802. This inhibits imitations or false detections of unique words from being applied to the burst synchronizer. The non-reference or regular unique word correlator 812 in conjunction with AND gates 814 and 816 and OR gate 818 operated in the same manner as that described above except that the latter elements generate pulses indicating the proper detection of the regular unique word and the complement of the regular unique word. An aperture gate from the aperture generator unit is also applied to AND gates 814 and 816. The latter aperture gate occurs at a time coincident with the expected detection of the regular and complement of regular unique words. The output of AND gate 816 is additionally applied to the control signal unit for identifying the sub-multiplexed data framing in a conventional manner. An inhibit signal from the aperture generator blocks detected pulses from passing through AND gates 814 and 816 whenever the reference unique word is lost, as will be explained in the description of FIG. 9.

Figure 8:
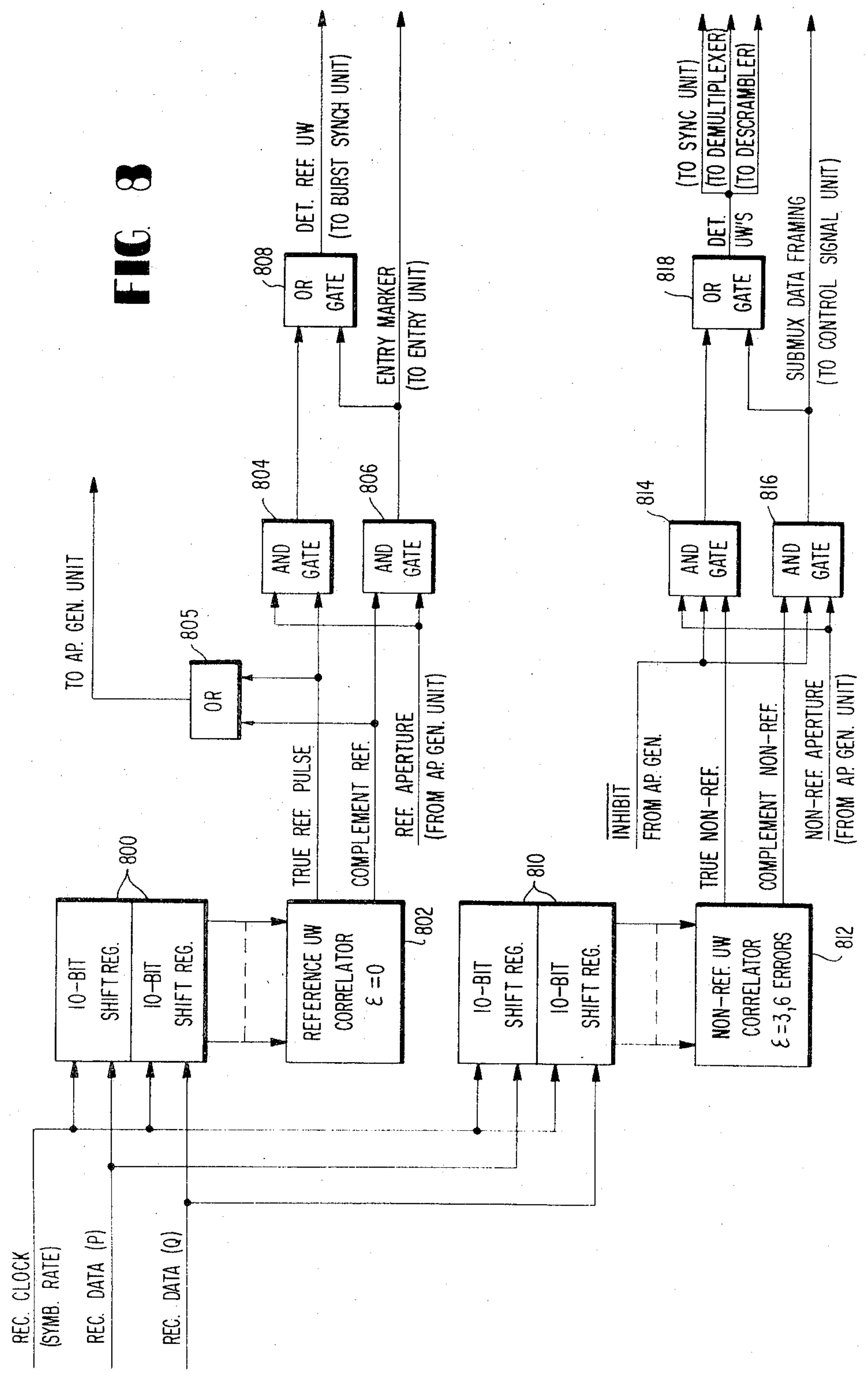
FIG. 8 is a block diagram of the preamble detector unit which forms a part of the receive side subsystem.
Figure 9:
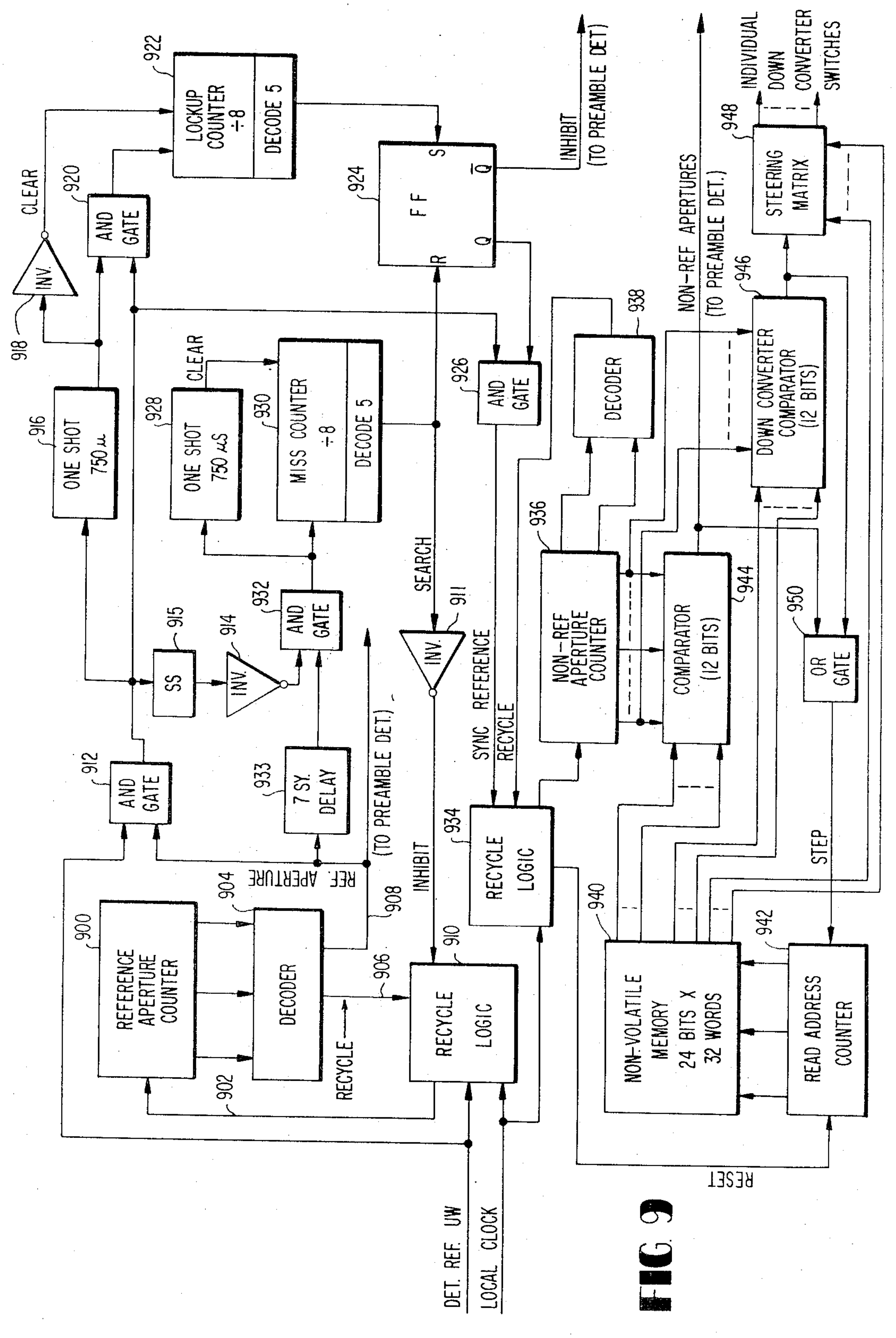
FIG. 9 is a block diagram of an aperture generator which forms a part of the receive side subsystem.

The aperture gates which are supplied to the preamble detector of FIG. 8 to gate out the detected reference, non-reference pulses are generated by the aperture generator illustrated in block diagram form in FIG. 9. In the specific example described herein the apertures are seven symbols wide and they serve the purpose of preventing the receive side sub-system from synchronizing to or locking onto an erroneously detected unique word. As will be appreciated, unique word correlators may be designed with certain error considerations taken into account so that they will provide an output pulse indicating the detection of a unique word even though the unique word may be received with errors in a few bit positions. The number of errors which a correlator can tolerate is referred to as the epsilon of the correlator. As is apparent, if epsilon is made relatively high, this ensures that the unique word will be detected with many errors and result in a low probability of misdetection. On the other hand, a high epsilon also results in a high probability of false detection. The high probability of false detection can be avoided by the use of the aperture gates. In other words, the unique word is only "looked for" during the seven symbol aperture and thus any false detections occurring outside of the aperture will have no effect on the system. It should also be noted that the reference unique word correlator in FIG. 8 has an epsilon value of zero. This means, that if there is an error in even one bit of the 20 bit reference unique word, the 20 bit reference unique word correlator will not generate an output reference pulse. This provides a needed very low probability of false detection for the reference unique word. However, on the other hand, there will be a high probability of misdetection of the reference unique word.

The apparatus of FIG. 9 which generates the reference aperture comprises a recycle logic 910, decoder 904, and reference aperture counter 900. The reference aperture counter has a count capacity of 7500, which is equal to the number of symbols per frame. The recycle logic 910 is a conventional circuit which operates as follows. A detected unique word from the OR gate 805 of the preamble detector is received by the recycle logic and operates to initiate the recycle sequence. Following initiation, the recycle logic passes local clock pulses, which occur at the symbol rate, to the reference aperture counter 900. The recycle logic 910 will continue to pass the local clock pulses to the reference aperture 900 provided it receives a recycle pulse on line 906 from decoder 904 every 250 microseconds. The recycle logic 910 will be shut off or inhibited in response to an inhibit input from inverter 911, and will not start again until the occurrence of the next reference pulse. The reference aperture counter counts the clock pulses at the symbol rate and recycles each frame. The decoder 904 detects a preset code in reference aperture counter 900 and provides an output recycle pulse on 906 which occurs at the frame rate. The decoder also detects a count corresponding to a few symbol widths prior to the beginning of a frame and further detects a count corresponding to a few symbol widths subsequent to the beginning of a frame to provide a seven symbol width reference aperture on the output line 908. The reference aperture is applied to the preamble detector and operates as described above to gate out the reference pulses to the burst synchronizer. Because of the operation of the reference aperture counter 900, decoder 904, and recycle logic 910 the reference aperture pulses will be generated following the receipt of a single detected reference pulse even though subsequent detected reference pulses are not received each frame. However, the system operates to inhibit recycling if five frames pass without the receipt of any detected unique word.

Before discussing the logic for inhibiting the recycling it should be noted that the system is not considered to be locked-on to the detected reference pulse until it receives five reference pulses in coincidence with said reference aperture for five consecutive frames. When the system does lock-up, it provides a sync reference pulse at the output from AND gate 926 which operates the logic for generating the non-reference aperture gate as will be described below. The apparatus for "locking-up" comprises AND gate 912, one shot multi-vibrator 916, inverter 918, AND gate 920, lock-up counter and decoder 922, and flip-flop 924. The first time a reference aperture is generated it prepares AND gate 912 for passage of a reference pulse. The first reference pulse passing through AND gate 912 triggers one shot multi-vibrator 916 which provides an output pulse lasting for 750 micro-seconds —equivalent to five frames. During that five frame period, the AND gate 920 is prepared for passing the reference pulses to the counter 922. If five detected reference pulses occur during the five frame period, the counter/decoder 922 will set flip-flop 924 thereby removing the inhibit signal from the preamble detector and preparing AND gate 926 for passing of the next occurring reference pulse.

The logic for inhibiting recycling of the reference aperture is similar to the logic for "locking-up" and comprises inverter 914, AND gate 932, one shot multivibrator 928 counter/decoder 930, single shot 915 and delay means 933. If a reference pulse is generated by the reference unique word correlator 802 (FIG. 8) during the seven symbol width of the reference aperture gate, there will be an output pulse from AND gate 912. The latter output pulse will effectively be stretched by the single shot 915 into a pulse having a width greater than fourteen symbol pulse times. This insures that AND gate 932 will not produce an output pulse. However, if a reference pulse is not generated during the seven symbol width of the reference aperture, the AND gate 932 will produce an output pulse, because the aperture gate will be applied to AND gate 932 after a delay of seven symbol clock times in means 933. At that time the output from inverter 914 will be at an up logic level. The output from AND gate 932 is counted by counter/decoder 930 and triggers one shot multivibrator 928. At the end of 750 micro-seconds the counter/decoder will be cleared by the lagging edge of the output from one shot multi-vibrator 928. Thus, if five consecutive misdetections occur, the counter/decoder 930 will provide a search output pulse which operates to reset flip-flop 924 thereby inhibiting the preamble detector and inhibiting the recycle logic 910. The recycle logic 910 will cease passing clock pulses to the reference aperture counter 900 until the occurrence of the reference pulse.

When the aperture counter is locked onto the detected reference unique word, a sync reference pulse at the output of AND gate 926 will be generated as described above. The sync reference pulse starts recycle logic 934 which cooperates with non-reference aperture counter 936 and decoder 938. The latter logic operates in a manner substantially identical with recycle logic 910, reference aperture counter 900, and decoder 904. The recycle logic will continue to be recycled once each frame and passes clock pulses to the non-reference aperture counter 936. The decoder 938 provides the recycle pulse each frame to continue the on condition of the recycle logic. The non-reference apertures are not provided by decoder 938 but instead are provided by comparator 944 in cooperation with non-volatile memory 940 and the aperture counter 936. The non-volatile memory 940 has words stored therein corresponding to time from the start of a frame (when the reference unique word is detected) at which non-reference aperture should be generated. The words of memory 940 are sequentially presented to the comparator 944 by the address counter 942 which is stepped after the generation of each non-reference aperture pulse. The read address counter 942 is reset at the beginning of each frame by the recycle pulse or the sync reference pulse which passes through the recycle logic 934. The comparator compares the output word, representing time, from memory 940 with the count, also representing time, in the aperture counter 936, and provides an output aperture when the two times are equal. By using a non-volatile memory 940, the system, once set up, can be reprogrammed to provide apertures for any desired received bursts at any time, provided it is known in advance when the desired burst unique word will occur. This is a simple matter because in a preassigned system the receiver station knows the frame position of the bursts it is to receive. Variation is accomplished by merely changing the words in the non-volatile memory 940. The variation of the words in memory 940 could be accomplished by a data processor by programming the data processor to alter the word either at specified times when it is known that traffic patterns will vary or in response to detections of changing traffic patterns.

The down-converter comparator 946, steering matrix 948, and the OR gate 950 pertain to multi-transponder operation which will be discussed in a later section of this specification.

Figure 10:
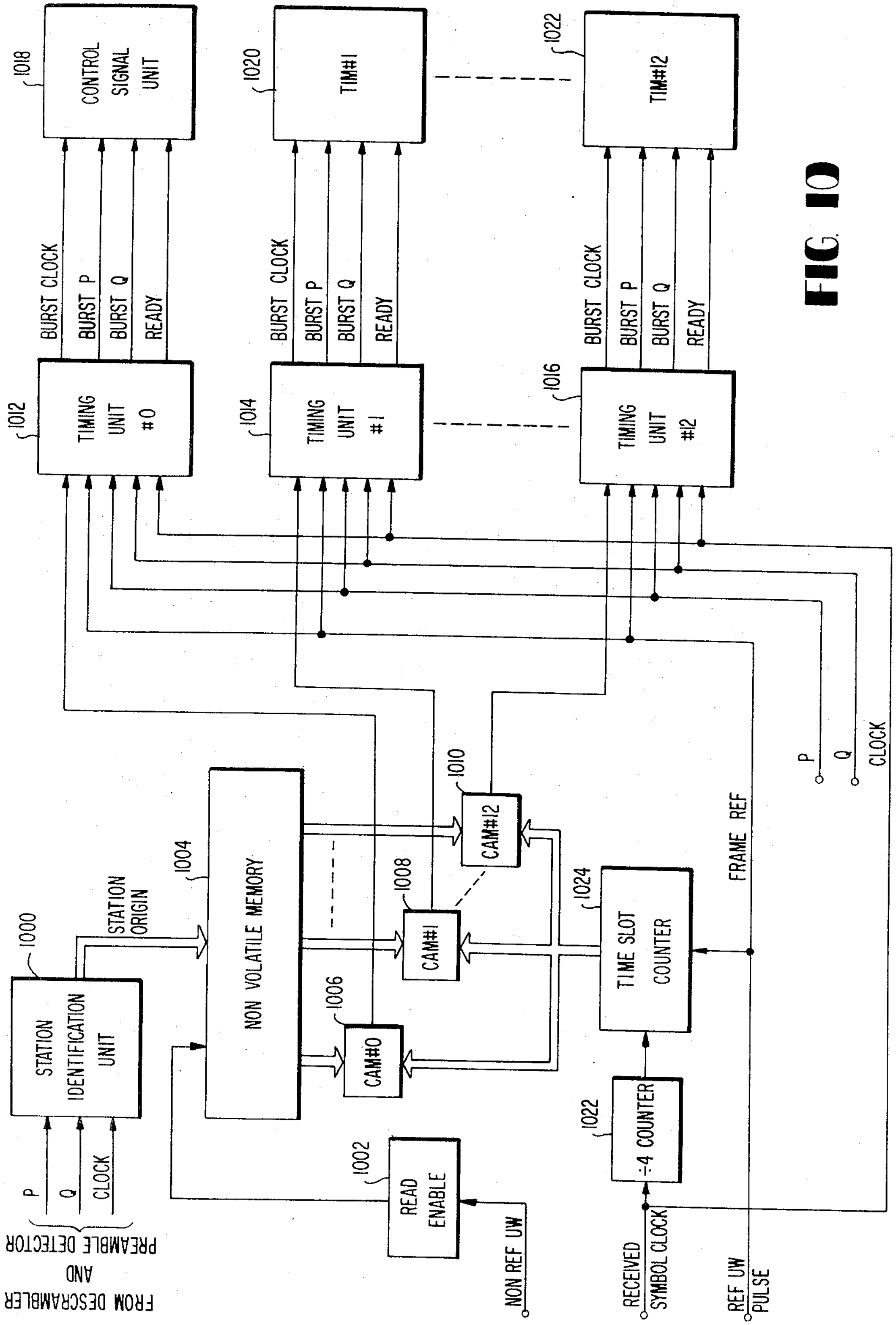
FIG. 10 is a block diagram of a demultiplexer which forms a part of the receive side subsystem.

An example of a demultiplexer unit for extracting the selected channels of data from the substantially continuous stream of received data and selectively applying portions of the data to the control signal unit and TIM units is illustrated in FIG. 10. As in the case of the multiplexer unit, the demultiplexer unit is controlled by words stored in a non-volatile memory. The non-volatile memory in the demultiplexer unit is 1004. However, unlike the case for the multiplexer, the non-volatile memory 1004 does not sequentially present output words to external means but rather is addressable by addresses corresponding to the burst origin.

As will be recalled from the above description, each burst contains a station identification code directly following the unique word. Since the position of all bursts is known, the origin of a burst can be determined by its position in the frame relative to the detected reference pulse. In the example described herein, an origin code is generated in a conventional manner on the basis of a priori burst position information. The station identification address may be compared with the origin code to insure that the means for generating the origin code is in fact operating correctly. As shown in FIG. 10 the means for generating the origin code is the station identification unit 1000 which is a part of the common control sub-system.

The origin code addresses memory 1004 and causes non-destructive read out from the memory of a word which pertains solely to the burst from the origin station. The word comprises thirteen fields for the particular example wherein the multiplexer has 13 input-output ports for connection to one control signal unit 1018 and 12 TIM units 1020. Each field identifies the beginning and ending time slots for one sub-burst within the burst from said origin station. The fields are compared, respectively, in content addressable memories 1006, 1008, and 1010, with the output from a time slot counter 1024 which accumulates time slots beginning with the start of the frame. In the particular example described herein a time slot is considered to be 8 bits or four symbols in length (corresponds to a conventional digital voice channel). The time slot counter 1024 is reset by the detected reference pulse from the preamble detector, and the time slot pulses which are accumulated by the counter 1024 are derived from the divide by four counter 1022 which, in turn, is pulsed by the symbol clock. There is a separate content addressable memory for every control signal unit and TIM unit. There is also a separate timing unit, e.g., timing units 1012, 1014, and 1016, for every control signal unit and TIM unit. At the proper time, under control of the words stored in memory 1004 and time slot counter 1024, a content addressable memory will provide start and stop outputs to its associated timing unit. The start and stop outputs turn on and off the respective timing unit to pass the received symbol clock and the received P and Q data to the respective control signal unit or TIM unit.

Although in the above description, it was pointed out that the demultiplexer selects whole sub-bursts for application to a particular control signal unit or TIM unit, it will be apparent that a sub-burst is not the smallest block of data which may be separately directed to a particular TIM unit. For example, any portion of a sub-burst may be directed individually to any TIM unit at any earth station. This is easily accomplished by having the word in the non-volatile memory 1004 define any desirable start and stop time slots within any given station's burst.

Flexibility is provided in that changing traffic patterns can be handled by merely changing the content of one or more words in memory 1004. The variation of words can easily be controlled directly or by a programmed data processor which varies the words at certain times where traffic changes are desirable or which responds to signals indicating the need for a change in assignment of sub-bursts.

Figure 11:
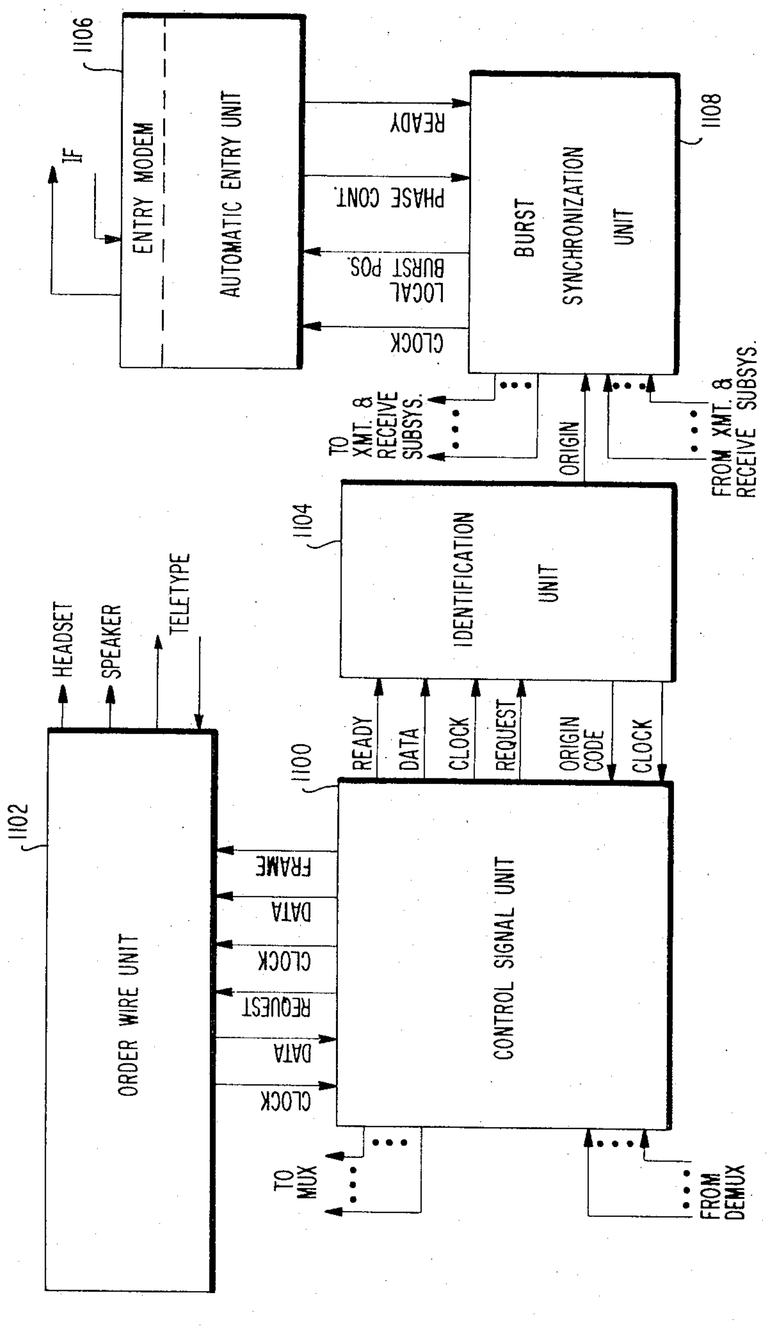
FIG. 11 is a block diagram of the control subsystem of the earth station.

A general block diagram of the control sub-system which provides control signals to the transmit sub-system and the receive sub-system is illustrated in FIG. 11. The control sub-system provides most of the control and housekeeping functions required within the TDMA system. These functions include (1) automatic burst acquisition and re-entry, (2) steady state burst synchronization, (3) burst or station identification via pre-ordered burst location and/or detection of SIC codes, (4) teletype and voice order wire services, (5) centralized signaling data transmission for demand assigned operation deemed necessary, (6) control in spare data channel, (7) switching to and from reference station modes, (8) redundancy switch over control.

These functions are performed by the order wire unit 1102, the control signal unit 1110, an identification unit 1104, a burst synchronization unit 1108, an automatic entry unit 1106, and, if desirable, a control processor not shown. A control processor is preferably included for flexibility purposes. For example, as described above, the words in the non-volatile memories of the multiplexer and demultiplexer may be varied in accordance with a program. The control processor may be the programmed device which varies the abovementioned words. Furthermore, the control processor may be programmed to vary burst times of the respective earth stations and perform other functions. The control signal unit 1100 shown in FIG. 11 is the same control signal unit referred to previously which performs the conventional function of generating or receiving the signaling data which appears to the multiplexer and and demultiplexer as merely TIM unit. As is well known in the art, the control signal unit receives blocks of data from the order wire unit 1102, the identification unit 1104 and a control processor if one is used. The received data are formated into burst form at the symbol clock rate and supplied to the multiplexer in the previously described manner. On the receive side, the demultiplexer strips out of each incoming burst the SIC code, the control bits and the order wire data as a single block and delivers the block to the control signal unit. There the signals are reduced in clock rate and reformated for delivery to the indentification unit, the order wire unit, and when applicable, to a control processor. The order wire unit 1102 may also be conventional and may provide teletype and voice audio wires. On the transmit side, the order wire signals are combined with the SIC code, and control bits in the control signal unit and the resulting block of data are applied to port 0 of the multiplexer. On the receive side the same signals from each burst are stripped out by the demultiplexer as explained above and provided from port 0 of the demultiplexer to the control signal unit. The station identification unit 1104 receives the SIC codes via the control signal unit, and provides an output which indicates the origin of the currently received burst. The origin information is applied to a burst synchronization unit 1108 which is described in more detail in connection with FIG. 12. The function of a burst synchronization unit, as is well known in the art, maintains the earth station burst in proper synchronism with the frame reference and provides burst start or burst initiate signals to the transmit side sub-system.

Figure 13:
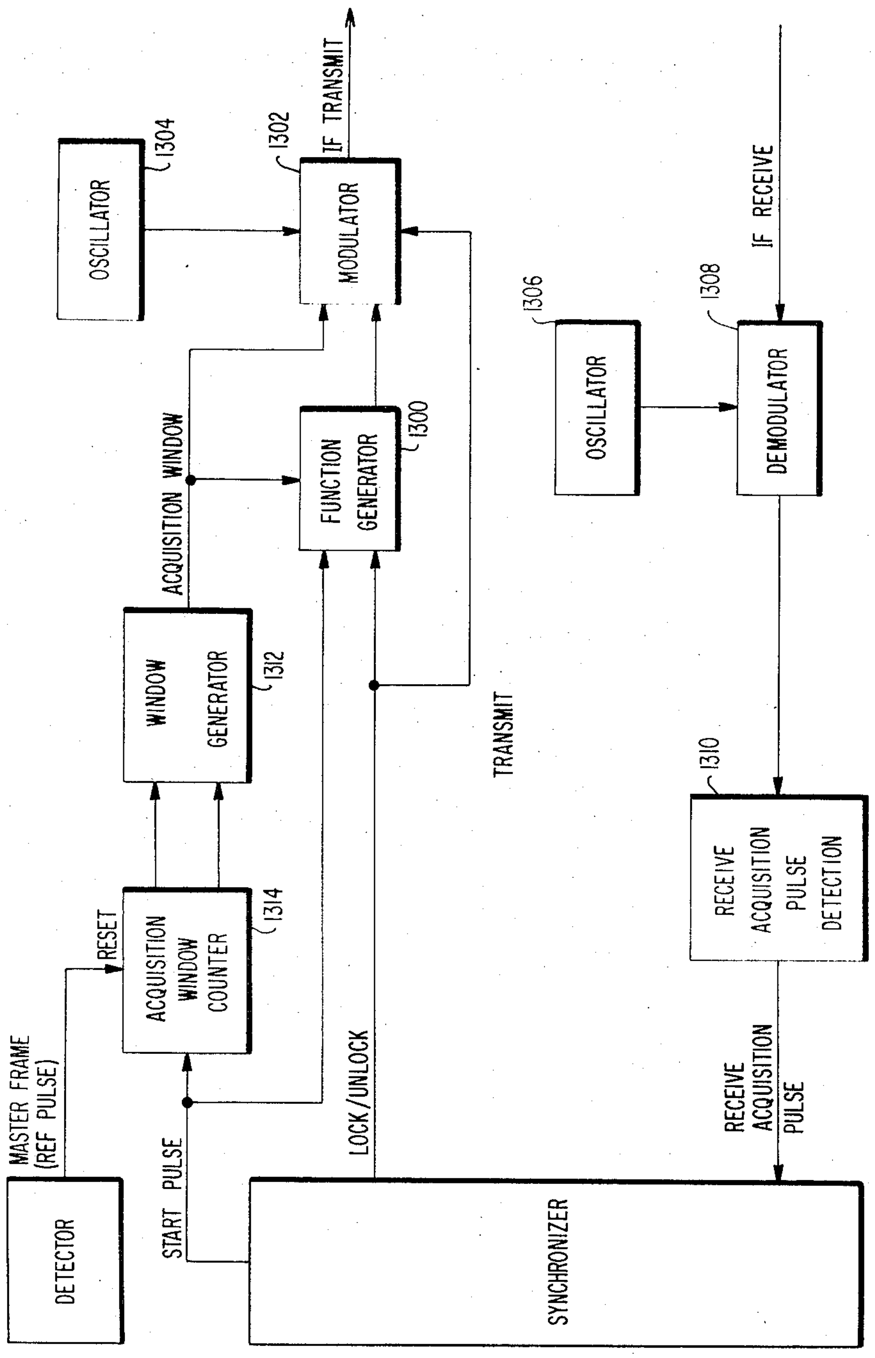
FIG. 13 is a block diagram of an automatic entry unit which forms a part of the control subsystem.

The automatic entry unit, which will be explained in more detail in connection with FIG. 13, cooperates with the burst synchronizer to provide automatic entry of the local station burst or bursts into TDMA frame upon initial station turn-on or whenever synchronization is lost.

Figure 12:
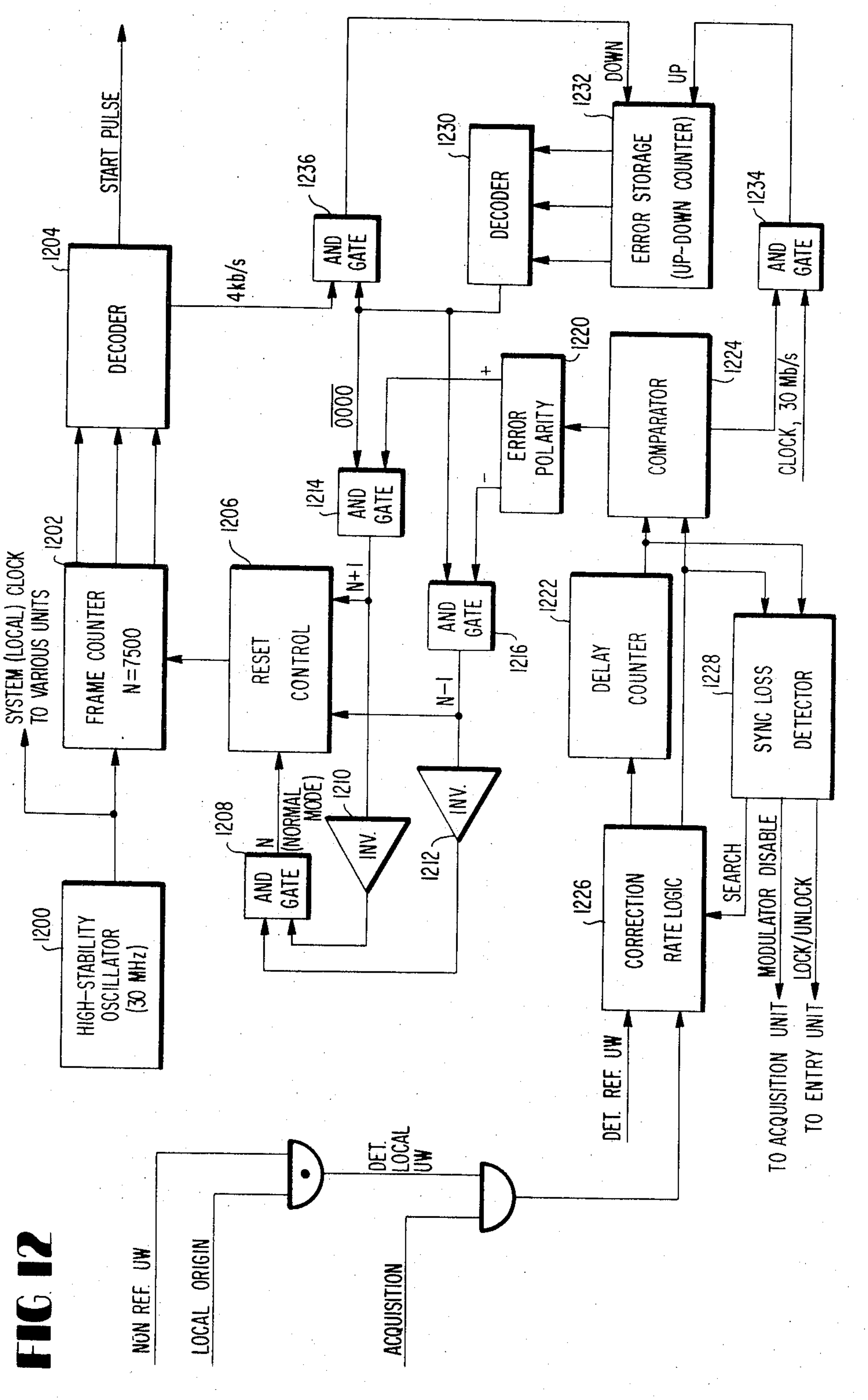
FIG. 12 is a block diagram of a burst synchronizer which forms a part of the control subsystem.

A block diagram of the burst synchronizer is shown in FIG. 12. The burst synchronizer generates a start of burst signal once each frame (250 micro-seconds), monitors the local station burst position and adjusts the start signal and thereby the burst position by delaying or advancing the start signal whenever the burst moves out of the correct position. A highly stable oscillator 1200, operating at the symbol rate of 30 megahertz, provides a source of output pulses which are counted by the frame counter 1202. Since the frame is 250 micro-seconds in length, and the symbol rate is 30 megasymbols per second, the frame counter has a nominal cycle time of seven thousand five hundred symbols. Thus, under nominal conditions the frame counter is reset under control of a reset control means 1206 whenever it reaches a count of N, where N equals 7,500. The count status of the frame counter is detected by a decoder 1204 which provides the burst start signals to the multiplexer. The decoder 1204 also provides an output pulse once every frame to the AND gate 1236. If the local station burst is in the proper position within the TDMA frame, the frame counter 1202 will continue to be reset at a count of N. However, if it is detected that the burst has moved back in time relative to the TDMA frame reference, the burst start time must be advanced to compensate for this error. Advancement of the burst start time is accomplished by resetting the frame counter at a count of $N-1$, thereby causing recycling of the frame counter one symbol time earlier each frame. On the other hand, if the burst has moved forward in time relative to the frame reference, this error can be compensated for by resetting the frame counter at a count of $N + 1$. It will be apparent that with this technique the burst may be moved only one symbol time per frame.

The remaining elements shown in FIG. 12 operate to provide the necessary detection of the local burst position. A delay counter, 1222, is loaded with a number corresponding to the required time delay between the TDMA reference burst and the local station burst. It should be noted that the burst position may be changed when the abovementioned control processor is used by programming the control processor to insert a different delay time in the counter 1222 under certain desired conditions. Measurement of the local burst position occurs only once every ⅓ second. This is because the round trip delay time through the satellite transponder is approximately ⅓ second and any prior correction will not show up until one third of a second has passed. The detection period is controlled by the correction rate logic 1226 in a conventional manner. When a reference pulse from the premable detector appears the delay counter 1222 begins counting down. When delay counter 1222 counts down to zero it provides an output pulse to the comparator 1224. If the local station burst is in the proper position relative to the reference burst, the unique word in the received local station burst will be detected, and an indication will be provided in time coincidence with the generation of the output pulse from delay counter 1222. If they are not in time coincidence, the comparator 1224 opens AND gate 1234 for an amount of time corresponding to the out-of-coincidence condition, and clock pulses at the symbol rate pass to an up-down counter 1232. The comparator also provides an output to error polarity indicator 1220 which provides a logic signal on one of its two outputs if the burst position error is in one direction, and provides a logic signal on the other of its output lines if the burst position error is in the opposite direction. A decoder 1230 provides one input to AND gates 1214, 1216, and 1236 provided there is a count greater than zero in the up-down counter 1232. The error polarity circuit 1220 provides the other inputs to AND gates 1214 and 1216. Thus, if there is an error, either AND gate 1214 or AND gate 1216 will be energized to cause the frame counter 1202 to be reset at a count corresponding to N+1 or N−1. On the other hand, if there is no error neither of the AND gates 1214 and 1216 will be energized with the result that the AND gate 1208 will be energized by the outputs from inverters 1210 and 1212. The result will be that frame counter 1202 will be reset at the normal rate. The AND gate 1236 counts down the counter 1232 one increment each frame until the error is reduced to zero.

During TDMA transmission there will be some transmission interruptions of short duration due to equipment switch-over, etc. For short duration interruptions, e.g. 30 seconds, it is desirable to resume transmission without going through the initial acquisition process which may require up to 1½ minutes. Resuming transmission when outages of up to 30 seconds have occurred will significantly reduce the number of times the initial acquisition mode will have to be used. This results in a faster normalization of transmission and fewer voice call disconnections and losses. The peak range rate of satellites presently in use is quite small, in the order of 3 nanoseconds per second. With high stability clocks and guard times of about six symbols, long periods of time, e.g., 30 seconds, can elapse before burst position correction is necessary. The problem arises in the TDMA equipment when there are brief prime power outages. During these outages and recovery of AC power, the contents of registers or flip-flops may change. Consequently, if transmission were resumed the burst may interfere with other bursts in the frame.

Figure 12B:
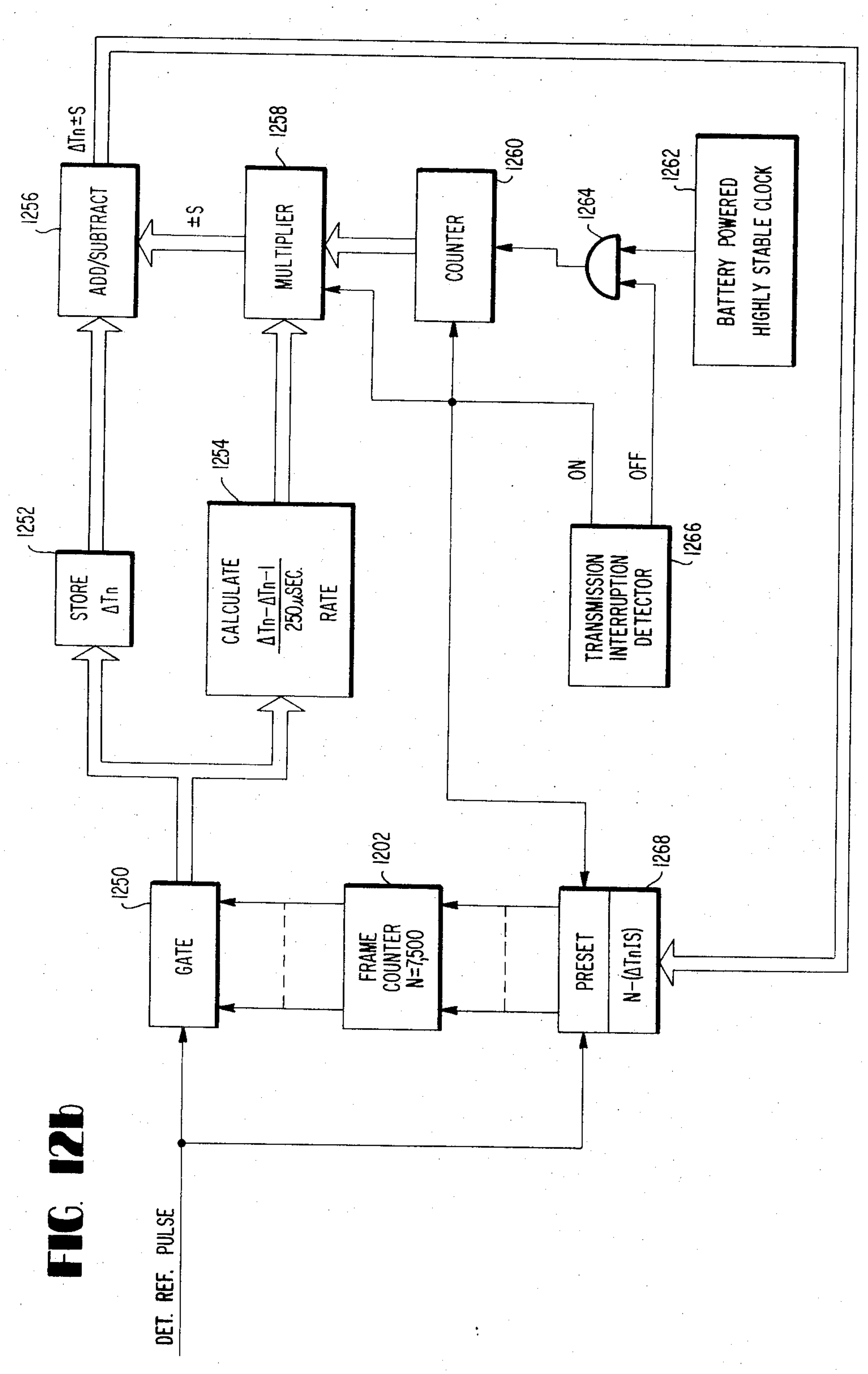
FIG. 12B is a block diagram of a rapid re-entry means which cooperates with the burst synchronizer.

The logic for performing rapid re-entry upon short term transmission interruptions is illustrated in FIG. 12B. The logic cooperates with the frame counter 1202 of the burst synchronization means (also shown in FIG. 12) in the following general manner. The frame counter contents is sampled upon the occurrence of the detected reference unique word pulse to obtain the value $\Delta T_n$ which represents the time difference, in symbols, between the detected reference pulse and the start pulse. The assumption is made here that the start pulse occurs when the frame counter recycles, i.e. goes from a count of 7,499 to 0000. The subscript n indicates that the time difference is the most recent time difference measured. The time difference may be obtained by gating the contents of frame counter 1202 through gate means 1250 into storage means 1252 in response to each of the detected reference pulses. The contents of storage means 1252 will be updated each frame. $\Delta T$ is also applied to means 1254 which operates to calculate the rate of change of time difference. As will be appreciated by anyone having ordinary skill in the art, the satellite position is constantly moving relative to the earth stations and therefore there will be a relative drift in time between the detected reference unique word and the stored pulse. The drift is calculated in terms of symbols per unit time and represents the output of means 1254. For short periods of time, e.g. 30 seconds, the rate will not change significantly. The calculator 1254 is also updated each frame and stores the calculated rate until the next frame when a new rate is calculated. When there is a transmission interruption, such as the loss of prime power, a means 1266 which may be a conventional detector for detecting interruptions of transmission prepares gate 1264 for passing clock pulses from a battery powered highly stable clock oscillator 1262 to a counter means 1260. The counter 1260 accumulates the clock pulses until transmission returns, at which time the transmission interruption detector 1266 provides an ON pulse which gates the contents of counter 1260 into the multiplier 1258 for multiplication by the rate stored in calculator means 1254. The ON pulse also resets counter 1260. The output of multiplier 1258 corresponds to the number of symbols which $\Delta T$ (the time between detected reference unique word and the local start pulse) would have changed during the transmission interruption. The latter value, which is designated $\mp S$ is combined with the last measured $\Delta T_n$ in add/subtract means 1256 to provide an output which represents the predicted time separation between the detected reference pulse and the start pulse for the instant that the power comes back on. The latter value is subtracted from N, which equals the number of symbols per frame, and the difference is preset into frame counter 1202 upon receipt of the first detected reference pulse following the ON pulse from transmission interruption detector 1266. As an example, assume that the last measured $\Delta T_n$ prior to transmission interruption was 2000 symbols and the last calculated and stored rate was +20 symbols per second. (It should be noted that a positive rate indicates an increase in the separation between the unique word pulse and the start pulse whereas a negative rate indicates a decrease in said separation). Also, assume that transmission is interrupted for 10 seconds. During the time that transmission is interrupted counter 1260 accumulates a number of clock pulses corresponding to a measure of 10 seconds. When transmission comes on again, the multiplier 1258 provides an output which corresponds to +200 symbols (+20 symbols per second times 10 seconds) and the output from add/subtract means 1256 corresponds to 2,200 symbols. Upon the occurrence of the next detected reference pulse, the value 5300 (7500–2200) is preset into the frame counter 1202. The frame counter, as described above, accumulates clock pulses at the symbol rate and therefore at a time corresponding to 2,200 symbols following the presetting of frame counter 1202, the frame counter will recycle to a count of 0000 and a start pulse will be generated. Although the logic for accomplishing rapid re-entry is illustrated in block diagram form, which is usually associated with hardware implementation, it will be apparent to anyone of ordinary skill in the art that the logic can be implemented by properly programming a control processor.

Since each earth station has a special time or times for transmitting its burst, and further since it is critical that data not overlap in a satellite transponder operating in the TDMA mode, whenever synchronism is lost, as detected by the sync lost detector 1228 of the burst synchronizer in FIG. 12, the PSK modulator 408 (FIG. 4) is disabled and will remain disabled until the synchronism is again achieved. Also, when synchronism is lost, the sync lost detector 1228 unlocks the automatic entry unit which is shown in FIG. 13. The purpose of the automatic entry unit is to place the earth station burst in the proper time position within TDMA frame without interfering with bursts from other earth stations. The automatic entry unit operates when the earth station is initially turned on and whenever burst synchronization is lost. A general block diagram of the automatic entry unit is illustrated in FIG. 13. The unit operates to transmit low power pulses which are in phase with the start pulse from the burst synchronizer. After transmission through the satellite transponder, the lower power pulses are detected and are applied to the burst synchronizer. The burst synchronizer operates on the detected pulses, hereinafter referred to as acquisition pulses, the same as it operates on the detected local unique word pulses. That is, the time difference between the detected reference unique word and the acquistion pulses is measured and stored in error storage means 1232, and the start pulse, which is the output of the burst synchronizer, is moved one symbol per frame until the timing between the detected reference pulse and the acquisition pulse corresponds to the time held in delay counter 1222. During the time that the automatic entry unit is in operation there will be no detected local unique word pulse to interfere with the operation of automatic entry because the modulator in FIG. 4 will be disabled and thus there will be no normal burst transmission from the earth station.

The transmit portion of the automatic entry unit comprises a function generator 1300, a modulator 1302, and an oscillator 1304. The function generator and modulator receive the lock/unlock control signal from the burst synchronizer. The function generator also receives the the start pulses, occurring at the frame rate, from the burst synchronizer. Devices for performing automatic entry are known in the art. In one such device, the function generator 1300 is a spread spectrum device. For example, the function generator may be a known PN sequence generator having a period equal to the frame period. The pulse sequence output from the function generator is exactly in phase with the start pulses and the pulse sequence modulates the carrier frequency from oscillator 1304 in the modulator 1302. The modulator 1302 may be a two phase PSK modulator for example. The output modulated sequence is transmitted in the normal fashion. However, it has a power which is 20 dB down from the normal burst transmission power. Consequently, even though the acquisition sequence will overlap bursts from other earth stations, there will be no interference at the earth station receivers because of the relatively low power level of the acquisition sequence. The acquisition sequence is detected at the receiver by the use of narrow band filtering techniques in the demodulator 1308. The sequence, after detection, is applied to the received acquisition pulse detection unit 1310 which may operate in known manner to provide received acquisition pulses in phase with the received signals. The burst synchronizer closes the loop between the received acquisition pulses and the start pulses to reposition the start pulses required. When the start pulse is properly positioned, the burst synchronizer will detect this condition and the sync loss detector 1228 (FIG. 12) will lock the automatic entry unit and enable the modulator (FIG. 4). The acquisition window counter 1314 and window generator 1312 shown in FIG. 13 will be described later in this specification.

Figure 13A:
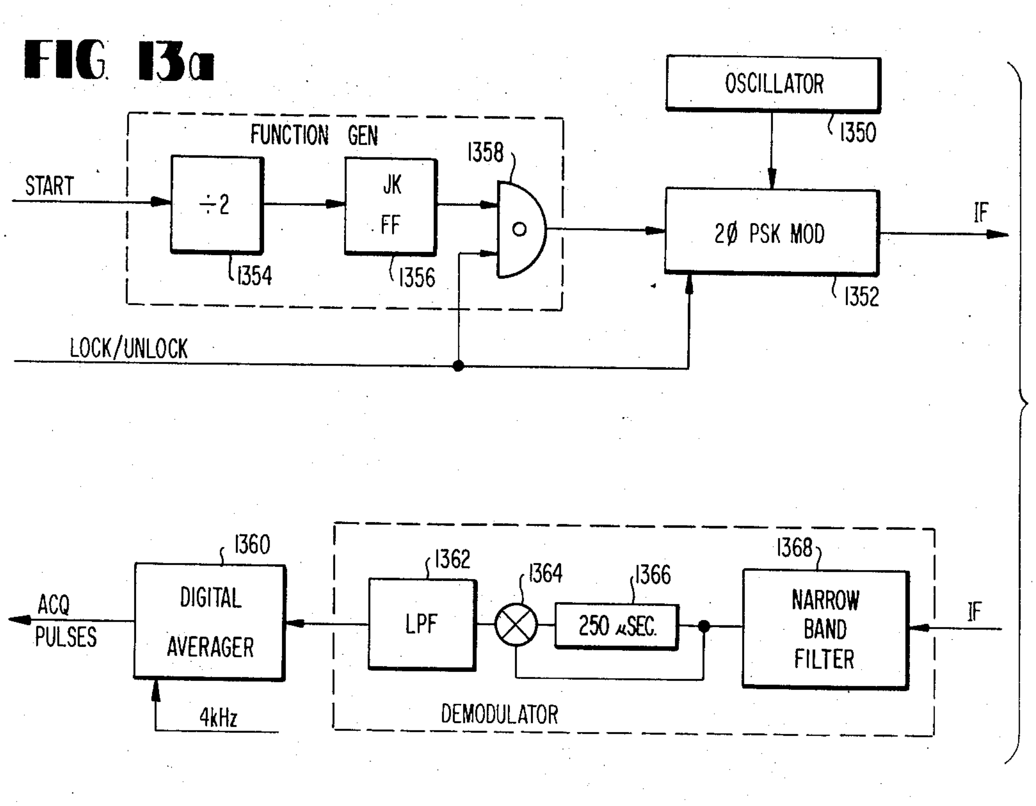
FIG. 13A is a block diagram which shows the details of parts of the automatic entry unit and FIG. 13B illustrates waveforms occurring at certain input and output lines in FIG. 13A.
Figure 13B:
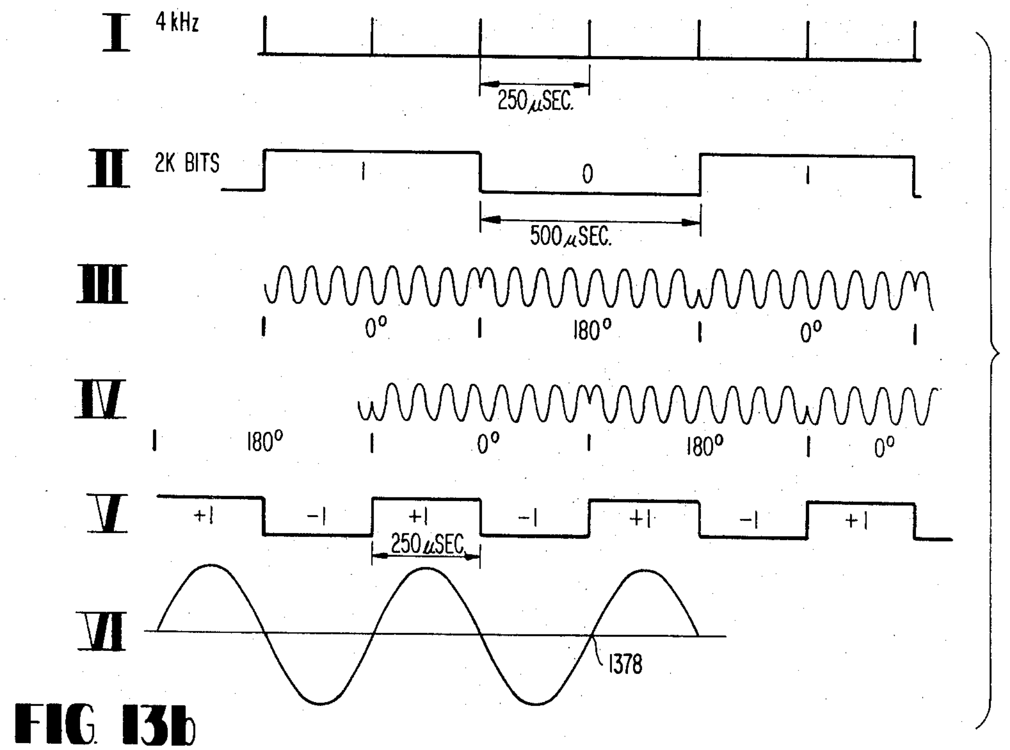
Figure 13C:
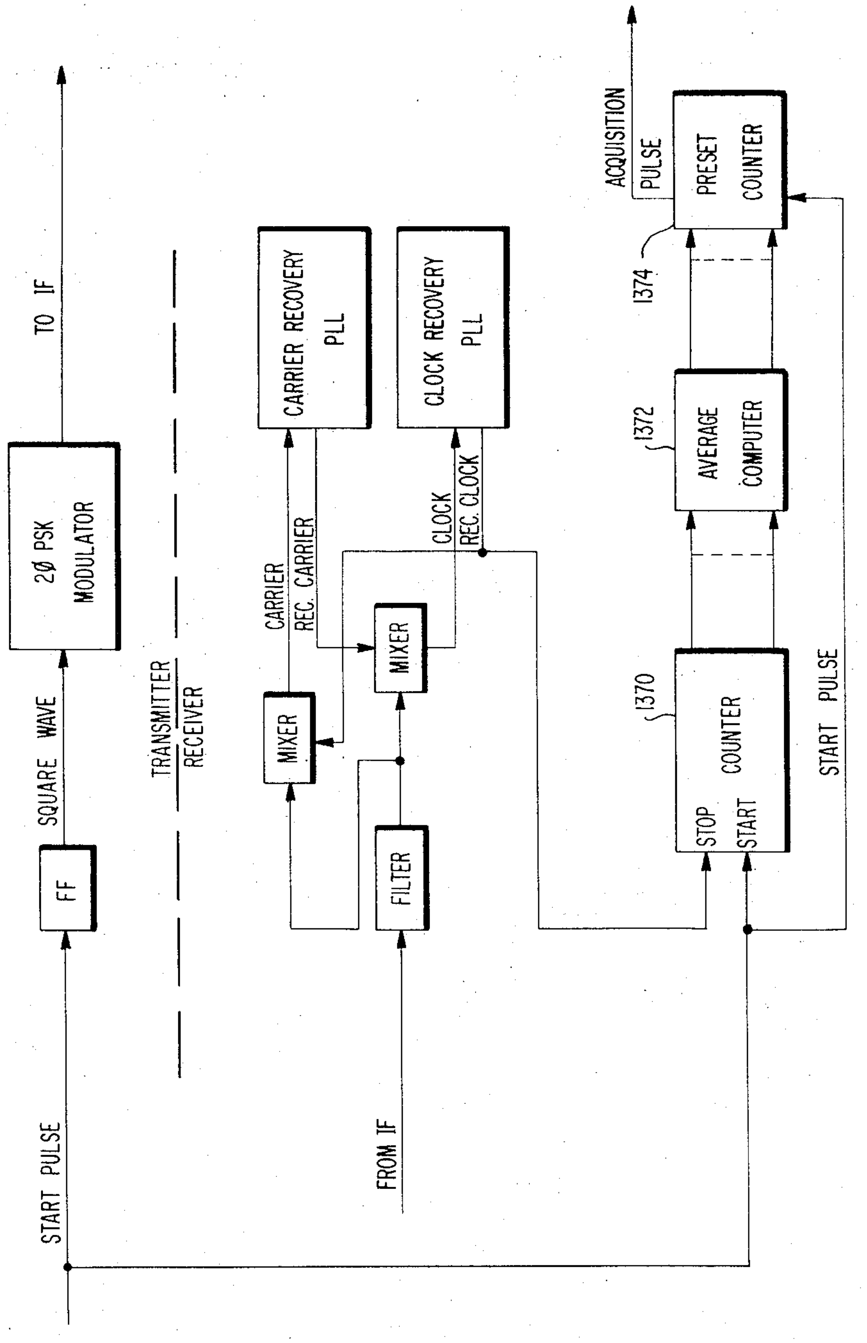
FIG. 13C is a block diagram of an alternate system to that which is shown in FIG. 13A.

Although there are known systems, as described above, e.g. the spread spectrum system, for generating an acquisition sequence, a novel system which is simpler and requires only very narrow band transmission will be described in connection with FIGS. 13*a*, 13*b* and 13*c*. FIGS. 13*a* and 13*c* represent two different embodiments of a square wave sequence acquisition system.

In FIG. 13*a* the function generator for the automatic unit merely comprises a square wave generator which generates an output that alternates between ones and zeroes. As an example, the function generator may comprise a divide-by-two counter 1354 and a JK flip-flop 1356. Also, an AND gate 1358 may be provided for passing or blocking the output sequence from the PSK modulator 1352. The relation between the start pulses which occur at the 4 kilohertz rate and the output sequence which are transitions at the 2 kilohertz rate is shown in wave form diagrams I and II in FIG. 13*b*. The wave form II modulates the carrier from oscillator 1350 in the two phase PSK modulator 1352 and the output is applied to the IF sub-system and then onto the satellite. The IF output from modulator 1352 is illustrated in wave form III. On the receive side, the IF signal is applied to a narrow band filter 1368 whose output appears as in wave form III, although there will be a large phase delay due to the one third second round trip time through the satellite. The output from narrow band filter 1368 is applied directly to multiplier 1364 as one input thereof and indirectly to multiplier 1364 as the other input thereto via a means 1366 for importing a 250 micro-second delay to the wave form. The delayed wave form is illustrated in wave form IV of FIG. 13*b*. When the delayed and undelayed wave forms are multiplied in multiplier 1364, the resultant is an alternate sequence of + and − 1's which corresponds to a square wave having transitions every 250 micro-seconds. The square wave is applied to a low pass filter 1362 whose output is a sign wave as shown in wave form VI having zero level crossovers every 250 micro-seconds. As will be appreciated, any phase change in the start pulses will result in a movement of the zero level crossovers in wave form VI. However, due to noise there will be jitter in the wave form output from the demodulator and this jitter will be seen as inaccuracies in the zero level crossover points of the output sign wave. To compensate for jitter, the output sign wave is applied to a digital averager 1360 which operates in a conventional manner to average the crossover points, relative to some standard 4 kilohertz reference, and provide acquisition pulses at the 4 kilohertz reference to digital averager 1360 may be derived from the detected reference unique word or may be locally generated by a highly stable oscillator.

An alternative embodiment of the square wave acquisition system is illustrated in FIG. 13*c*. There the square wave transmitted has transition every 250 micro-seconds. The carrier and then the square wave is received by a carrier recovery phase locked loop and a clock recovery phase locked loop as is conventional for 2 $\phi$ PSK demodulation. The transition of the square wave, seen as clock pulses at the output of the clock recovery phase locked loop, are averaged to compensate for the jitter problem described above. As illustrated the reference used is the start pulses. The average time difference between start and stop inputs to the counter is calculated over a period of time in averaging means 1372. The average time is entered into preset counter 1374 and an acquisition pulse is generated the average time following each start pulse. The average time is updated each frame.

In the description thus far the system has been considered only from the standpoint of operating with a single transponder on the satellite. That is, all earth stations in the TDMA system send up their bursts at relative times within a single frame, but at the same up-link frequency, and the bursts are received in non-overlapping manner by the satellite transponder, converted into the transponder down-link frequency, and sent back down to all earth stations in the sequence received. However. one of the features of the TDMA system described herein is the capacity for the earth stations to operate in a multi-transponder TDMA mode with relatively little hardware changes. Multi-transponder operation may be easily understood by assuming that the satellite has a plurality, e.g. six, transponders each capable of receiving signals at six respective up-frequencies and transmitting signals at six respective down-frequencies. Interference between transponders is prevented by frequency separation whereas transmission bursts within any given frequency is prevented from interfering with transmission bursts from other stations at the same frequency by time separation, as in the single transponder TDMA mode. Each transponder will have its own TDMA frame, although the transponder does not determine the frame period, and any given earth station may send bursts to one or more of the transponders and may receive bursts from one or more of the transponders depending upon the number of frequency up-converters and frequency down-converters located at the earth station. As an example, an earth station at a very busy location may have the capability of sending separate bursts in each transponder TDMA frame whereas an earth station in the same TDMA system may be capable of sending and receiving on only one frequency, i.e. in a single transponder TDMA frame.

Figure 3:
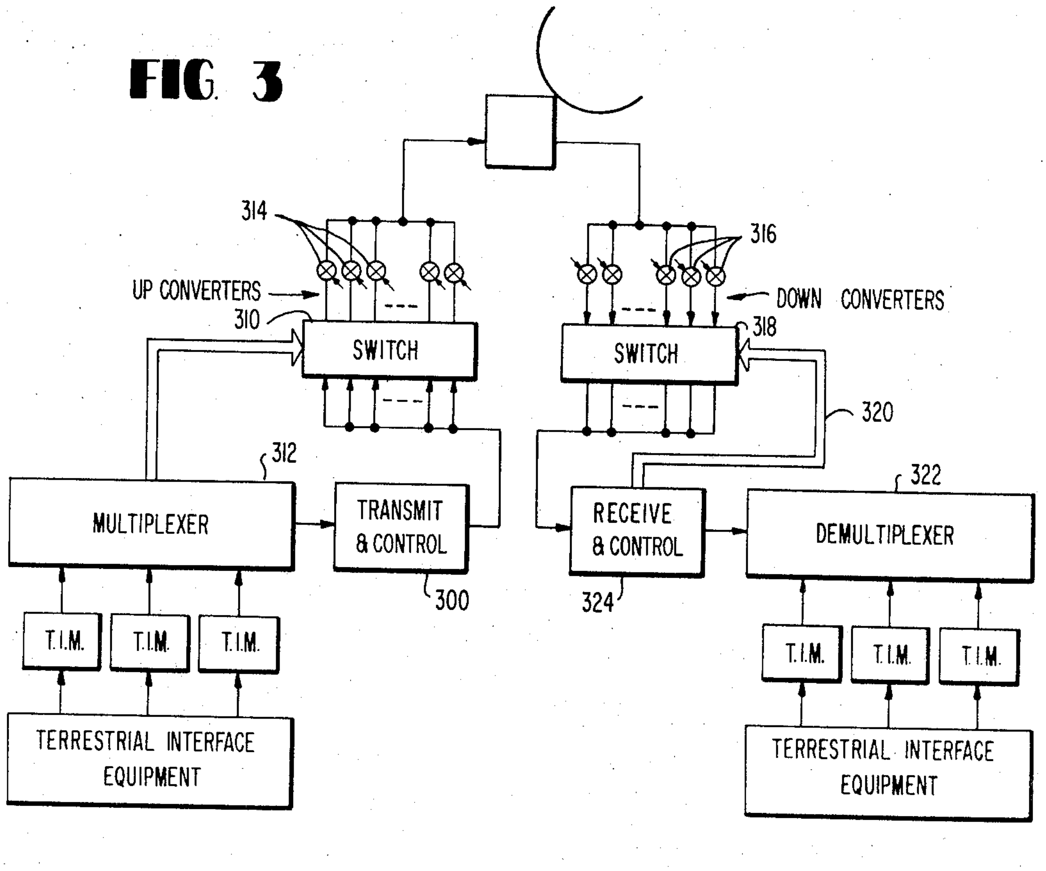
FIG. 3 is a general block diagram of the TDMA system with the added capability of operating in the multi transponder mode.

The general block diagram for multi-transponder operation is substantially similar to that shown in FIG. 1 with the addition of up-converters, down-converters and switching means, all of which are shown generally in FIG. 3. In the example of multi-transponder operation described herein the assignment of bursts to be transmitted or received by any given earth station is made on a non-overlapping basis. Thus, for example, even though a given earth station may send three bursts to thre respective transponders, and even though the bursts will be at separate frequencies, the earth station is only capable of sending out one burst at a time.

As seen in FIG. 3, the output from multiplexer 312 passes through the remaining portion of the transmit side sub-system 300 whose output in turn is applied to one of the selected up-converters 314 under control of switching means 310 and multiplexer 312. The variation in multiplexer 312 which will be described hereafter provides control signals to the switching means 310 to select the up-converter, and thereby select the particular TDMA transponder frame, to which the current burst is assigned. Although only three TIM units are illustrated, it will be apparent that many more such units may be included in the station. Furthermore, the relation between sub-bursts from the TIM units and the multiple bursts from the same station may be arranged in any desired fashion. For example, TIM units 1, 2, and 3 may supply sub-bursts which make up the single burst that is included within the TDMA frame for transponder number 1; TIM units 4, 5, and 6 may provide the sub-bursts which comprise the burst for inclusion in the TDMA frame of transponder number 2; etc. It should be understood that a burst need not include blocks of data from consecutively numbered TIM units. Furthermore, data from a given TIM unit need not be confined to a single burst. For example, TIM unit 1 might supply n channels of data in a sub-burst to transponder #1 and m channels of data in sub-burst to transponder #2.

When the earth station receives the down signals after passage through the satellite transponders, at any given instant of time only a single down converter 316 will be switched on by switching means 318. The switching means is controlled by the aperture generator in the receive side sub-system 324 as will be described below. At the output of the switching means the signals are at the IF frequency and they are applied to the receive side sub-system 324. The de-multiplexer 322 which is part of the receive side sub-system operates as previously described.

Although each of the transponder frames is independent, it is desirable to have all frames synchronized. This desire relates to possible switching of transponder inputs and outputs which could be accomplished but which forms no part of the present invention and therefore will not be described herein. However, synchronization of the frames is important. Synchronization could be accomplished by sending out a separate reference burst at each of the transponder frequencies from the same reference station at the same time. However, the power requirements for this type of operation would be too great. Another technique would be to have different stations send out the reference burst for the different transponder frames and have one of the reference bursts serving as the major or overall reference burst. All of the other reference stations would synchronize their own transponder reference bursts to the major or overall reference burst. This operation involves double synchronization detection. First there must be synchronization control between the major reference and the sub-references and secondly there must be synchronization control between the sub-reference and all normal bursts within that particular transponder frame.

Figure 3A:
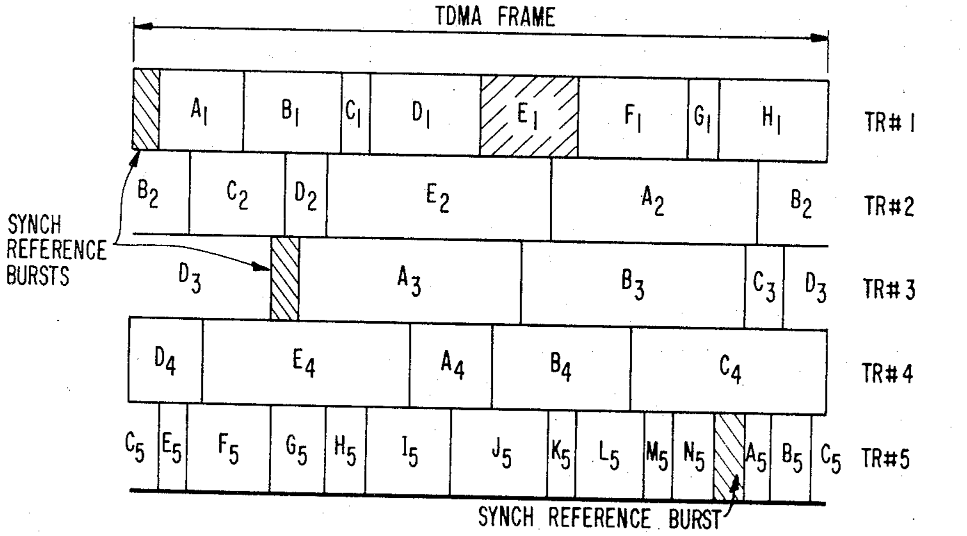
FIG. 3A illustrates the relationship between the different transponder frames in the multi transponder mode.

In the particular embodiment described herein the preferred multi-transponder frame synchronizing technique is to have a single station send out reference bursts for all of the transponder frames with the multiple reference bursts being staggered in time to avoid heavy power requirements on the earth station. Furthermore, it is not necessary that there be one reference burst for every transponder frame. There could be, for example, one reference burst in every other transponder frame. The normal burst within a particular transponder frame which has no reference burst will synchronize onto one of the reference bursts from a different transponder frame. This is easily accomplished by having at least one down converter in the earth station which is capable of receiving a transponder frame which has a reference burst therein. An example of the relative formats of six transponder TDMA frames is shown in FIG. 3A wherein the cross hatched bursts represent reference bursts. The letters A, B, C etc. represent normal burst from earth stations, with the sequence of bursts within any given frame being the same as the normal alphabetical sequence. It should be noted that the A bursts within the five frames illustrated do not necessarily emanate from the same earth station. The letters merely designate the order of bursts within the frames. In operation, the reference station sends out the three reference sync bursts illustrated, all including the twenty digit reference unique word, and the normal bursts within the transponder frames 1, 3 and 5 are synchronized to the respective reference bursts within their own frames. Since the reference bursts emanate from the same station, bursts synchronization, which is required for normal bursts and is carried out by the burst synchronizer, is not necessary for the reference bursts. The normal or regular bursts within transponder frames 2 and 4 may be synchronized to any of the other reference bursts.

The additional logic necessary for the multiplexer to control switching of the up converters is shown in FIG. 6 as including a transponder address holding register 626, a transponder steering matrix 628, and flip-flops 630. The additional logic operates in a substantially identical manner to the address holding register 618 and the steering matrix 602. However, in this case the address which is read out of non-volatile memory 600 represents a specified output line from the steering matrix 628 which either turns on or off one of the flip-flops 630 to gate on the selected transponder. The timing of the transponder gates is controlled by the time field of the words within the non-volatile memory 600. The flexibility of the system becomes apparent when it is realized that a mere change of words stored within the non-volatile memory can result in a complete reordering of (1) the relationship between sub-bursts and bursts, (2) the relationship between bursts and transponder frames, (3) the timing of bursts. It will be apparent that matrices 628 and 602 may be parts of a single steering matrix, and one register may take the place of registers 626 and 618.

On the receive side, the non-volatile memory 1004 (FIG. 10) of the demultiplexer provides the same flexibility in extracting desired information from the accepted bursts and directing them to the designated TIM units. However, the non-volatile memory 1004 in the demultiplexer does not control the down-converters. This control is provided by the third non-volatile memory which is memory 940 and is included in the aperture generator (FIG. 9). It will be recalled from the above description of the aperture generator that non-volatile memory 940 includes at least one word therein corresponding to the time at which the non-reference aperture is to be generated. For multi-transponder operation, non-volatile memory 940 also includes words which define a selected down converter and the times for turn on and off of said selected down converter for accepting the desired bursts. The non-volatile memory 940 operates in the same manner as described above, however, the field of the output word which defines the particular down converter to be selected is applied to steering matrix 948 and the field which defines the time at which the down converter is to be turned on or off is applied to the down converter comparator 946. Comparator 946 operates to provide an event pulse to steering matrix 948 when the non-reference aperture counter 936 contains a time count therein which is the same as the time defined by the time field of the memory word. The event pulse is diverted through the steering matrix 948 to the proper output for turning on or off the selected down converter. The aperture pulse from comparator 944 and those from comparator 946 are applied through the OR gate 950 to step the read address counter 942. The read address counter thus presents the stored words in sequence to the memory output terminals. In order to allow a given earth station to accept and synchronize with one selected reference unique word, at the start of operations when the receiver is first turned on only the down converter for the transponder frame which contains the desired reference unique word will be turned on. The normal control of the down converters will be ineffective at this time because the non-reference aperture counter 936 will not begin counting until the system locks onto the detected reference unique word. Once the reference unique word is detected, the system begins normal operation. Acceptance of the desired reference unique word thereafter is under the control of memory 940 in the same manner as acceptance of all desired bursts or sub-bursts.

Another feature of the disclosed embodiment, which pertains to the single transponder and multitransponder operation, is that of providing an acquisition window for acquisition operation. As described above in connection with FIG. 13, when synchronization is lost or when the system first turns on, it is necessary to find the proper position within the frame for the station's burst or bursts. Although acquisition can be accomplished without interfering with normal transmission from other stations because of the relatively low power density of the acquisition signals, if two earth stations tried to acquire or enter the frame at the same time, the two acquisition signals could interfere with one another. Consequently, in accordance with a particular technique of the described system, acquisition windows are provided. The windows last approximately four seconds and during a given window only one of the earth stations may try to acquire its burst position. A frame for the acquisition windows may occur once each minute by transmitting the complement of the reference burst for a few successive frames. The complement of the reference unique word is detected in the preamble detector as described above. The detected complement of the reference unique word resets an acquisition window counter 1314 (FIG. 13) which receives start pulses from the burst synchronizer and therefore counts at a rate corresponding to the TDMA frame rate. A window generator 1312 having time either stored therein or supplied thereto by a processor generates an acquisition window or gate which begins when the acquisition window counter 1314 reaches a first predetermined number and terminates when the acquisition window counter 1314 reaches a second predetermined number. The numbers at each earth station will be different so that the acquisition windows will not overlap. The acquisition windows operate to gate on the function generator 13 and modulator 1302. Referring to FIG. 13A, the acquisition window may be applied as a third input to the gate 1358 in the function generator.

Although, as has been pointed out above, the TIM modules may take various forms and may comprise conventional signal converters with conventional compression/expansion buffers, novel TIM units may also be used. One novel TIM unit which has particular, although not exclusive, adaptability to the present system, will be described in connection with FIGS. 14 and 15. The TIM unit described is one which receives analog voice channels and after sampling, coding, multiplexing the multiple voice input channels onto a single output channel, holds the data ready for extraction at the request of the TDMA multiplexer. As is well known, it is conventional to convert voice data into digital form by sampling each voice channel at the nyquist rate. Each voice sample is coded into a digital word, e.g. conventionally an eight bit digital word. The digitized voice signals, commonly known as PCM data, have a frame rate which is equal to the nyquist rate. For example, a conventional PCM 1400, as shown in FIG. 14, receives multiple voice input channels VC 1, VC 2, VC 3, etc., and operates to sample each channel once every 125 micro-seconds, code each sample, and multiplex the encoded samples onto a single output line.

Figures 14, 14A:
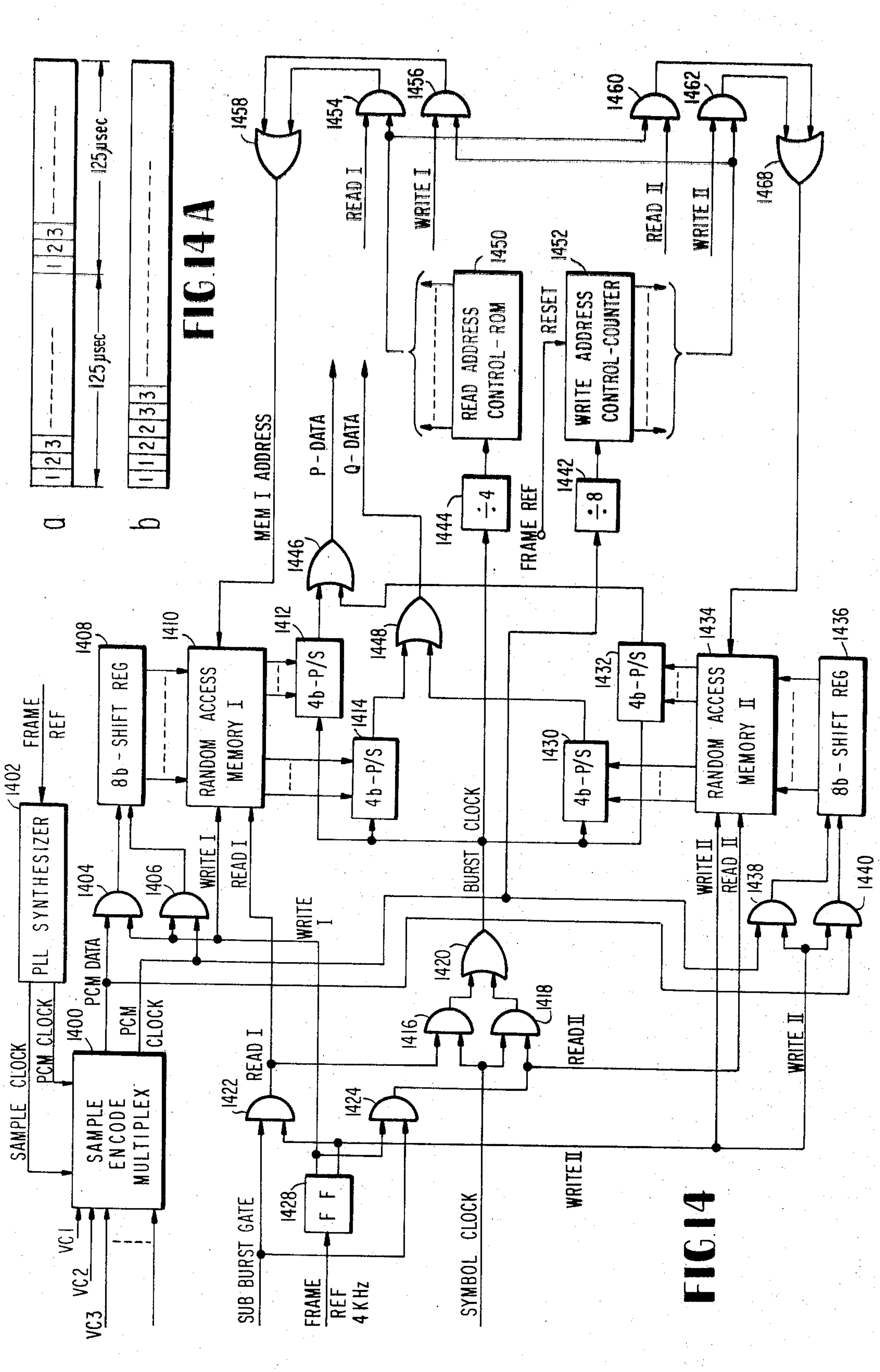
FIG. 14 is a block diagram of the transmit side of a terrestrial interface module for revising the order of channels in multiple PCM frames.
FIG. 14A is an illustration of a PCM frame format and a TDMA frame format helpful in understanding the block diagram of FIG. 14.

The frame format of PCM data is illustrated in line a of FIG. 14A. The individual channels are indicated by the numbers 1, 2, 3, etc. As will be recalled, a TDMA frame in the disclosed embodiment is 250 micro-seconds long. Thus for each individual voice channel two coded samples must be transmitted each TDMA frame. Considering the entire PCM frame and burst format arrangement, this means that two PCM frames must be transmitted during the sub-burst which is allocated to the particular TIM unit. As can be seen, if the data is sent out as formed, the sub-bursts will appear the same as the two frames, shown in line a of FIG. 14A with the exception that the time will be greatly compressed due to the higher bit rate of the TDMA system. However, this can present minor complications at the receiver if it is desired to extract some of the channels in a 125 micro-second PCM frame for application to one TIM unit and to extract other channels the same PCM frame for application to a different TIM unit. For example, if it were necessary to extract only channels 1, 2 and 3 for application to TIM unit#8, when the sub-burst containing the two PCM frames is received, two gates will have to be generated for extracting the three channels.

As will be appreciated, the latter complication can be significantly reduced by placing the like channels from successive PCM frames in adjacent positions within the sub-burst as illustrated in line *b* of 14A. The like channels may be placed together in a number of different ways. For example, the simplest technique would be to store two PCM frames and when reading the information from the compression memory at the request of the TDMA multiplexer, channel one from the first frame can be sent on the P data line and channel one of the second frame can be snet on the Q data line. Another way would be to split up each 8-bit channel and transmit channel one of the second PCM frame directly after the transmission of channel one of the first PCM frame. The latter technique has greater flexibility since it is not confined to a four phase PSK system. A detailed embodiment for forming the data in the proper order and transmitting same is illustrated in FIG. 14.

The PCM device 1400, which was referred to above, receives clock pulses from phase locked loop synthesizer 1402 which is synchronized to the TDMA frame reference signal from the TDMA multiplexer. In the drawing the clock output pulses are indicated as the sample clock and the PCM clock. The PCM device 1400 operates in a well known manner to provide the PCM data at one output and the PCM clock at another output. As will be well understood by anyone of ordinary skill in the art, the output data and the output clock are continuous. Two random access memories (RAM I) and (RAM II) are provided for alternately writing and reading the PCM data. The read/write functions switch every frame. Thus, during the first TDMA frame all of the PCM data may be written into RAM I an during the second TDMA frame all of the PCM data may be written into RAM II. Since the PCM data is continuous, the write operation will also be continuous, switching every TDMA frame between RAM I and RAM II. When a sub-burst gate arrives from the TDMA multiplexer, it initiates the operation. The memory which is read from is always the opposite of the one which is being written into.

Control of the switching is accomplished by flip-flop 1428, AND gate 1422, 1424, 1404, 1406, 1438, 1440, and 8-bit serial/parallel shift registers 1408 and 1436. Each frame reference signal from the TDMA multiplexer toggles flip-flop 1428 and therefore the Write I and Write II logic controls alternate each TDMA frame. During the Write I period, AND gate 1424 is prepared for passage of the sub-burst gate, also received from the multiplexer unit. The output of AND gate 1424 is the Read II control signal. During the Write II period, the AND gate 1422 is prepared for passage of the sub-burst gate. The output of AND gate 1422 is the Read I control signal.

The Write I control signal also gates the PCM data and PCM clock through AND gates 1404 and 1406, respectively, to gate the PCM data in 8-bit segments into shift register 1408. Each 8-bit word, corresponding to a digital voice channel, is shifted in parallel into RAM I location under the control of the Write I control signal and memory I address signal. Since the Write I control signal lasts for 250 micro-seconds, two successive frames of PCM data are entered into RAM I. When flip-flop 1428 is toggled, AND gates 1438, 1440, and the 8-bit serial to parallel shift register 1436 cooperate in a similar manner as that described above to enter the digital voice data into RAM II. The 8-bit words are entered into location in RAM II under control of the memory II address.

During read out, the words from RAM I are entered into the pair of 4-bit parallel to serial shift registers 1412, 1414. The words are selected from the address location indicated on the memory I address input. For each 8-bit word, four bits are entered into shift register 1412 and the other four bits are entered into shift register 1414. The bits in the latter shift registers are clocked out by the burst clock and pass through OR gates 1446 and 1448 onto the P data and Q data lines. The outputs from OR gates 1446 and 1448 represent the two channels of data which are transmitted during the sub-burst time. RAM II cooperates with 4-bit parallel to serial shift registers 1439, 1432 to operate in the identical manner. The burst clock is derived from the symbol clock which comes from the TDMA multiplexer. The symbol clock is gated through AND gates 1416 and 1418, and OR gate 1420 during the time that the Read I or Read II control signals are generated.

Assuming that the PCM frame includes 500 voice channels, each of the random access memories must have 1,000 8-bit word locations. During the Write period, the memory address control line causes the 8-bit words to be written in sequentially so that at the end of a 250 micro-second period, channel 1 of PCM frame 1 is written in location 1, and channel 1 of PCM frame 2 is written in location 501. Addressing may be controlled by a counter which advances one count every eight PCM clocks.

During read out, the sequence would be, read out location 1, followed by location 501, followed by location 2, 502 etc. The addresses applied to the random access memories during read out come from a read only memory which stores 1000 addresses in the proper sequence. The read only memory which controls the selection of words during read out is shown at 1450, and the counter which controls selection of the sequence during the write in is shown at 1452. The write address control counter 1452 is reset in response to the frame reference pulse and is incremented once every eight PCM clock pulses. This is accomplished by applying the PCM clock pulses to a divide by eight counter 1442 whose output actuates the counter 1452. Thus, during a single TDMA frame the counter 1452 provides addresses sequentially from 0 to 999. When the PCM data is being written into RAM I, the write addresses pass through AND gate 1456 and OR gate 1448. When PCM data is being written into RAM II, the write addresses pass from counter 1452 through AND gate 1362 and OR gate 1468.

The read address control means 1450 is actuated every eighth burst clock by the output of divide-by-eight counter 1444. Each input pulse applied to the read address control means 1450 sequences the device to cause the next address in sequence to be read out therefrom. When data is to be read out of RAM I, the output from control means 1450 passe through AND gate 1454 and OR gate 1458. When data is being read out from RAM II, the control means output passes through AND gate 1460 and OR gate 1468. The result of the apparatus illustrated in FIG. 14 is that the continuous PCM data will be sent out during the sub-burst time allocated to the particular TIM unit and in a form as indicated in line *b* of FIG. 14A. As will be apparent the functions of the addressing means may be reversed. The read addresses may be taken from a counter and the write addresses may be taken from a read-only-memory. The important factor is that the addressing be such as to result in the desired read out sequence of 1,1,2,2,3,3, . . . .

Figure 15:
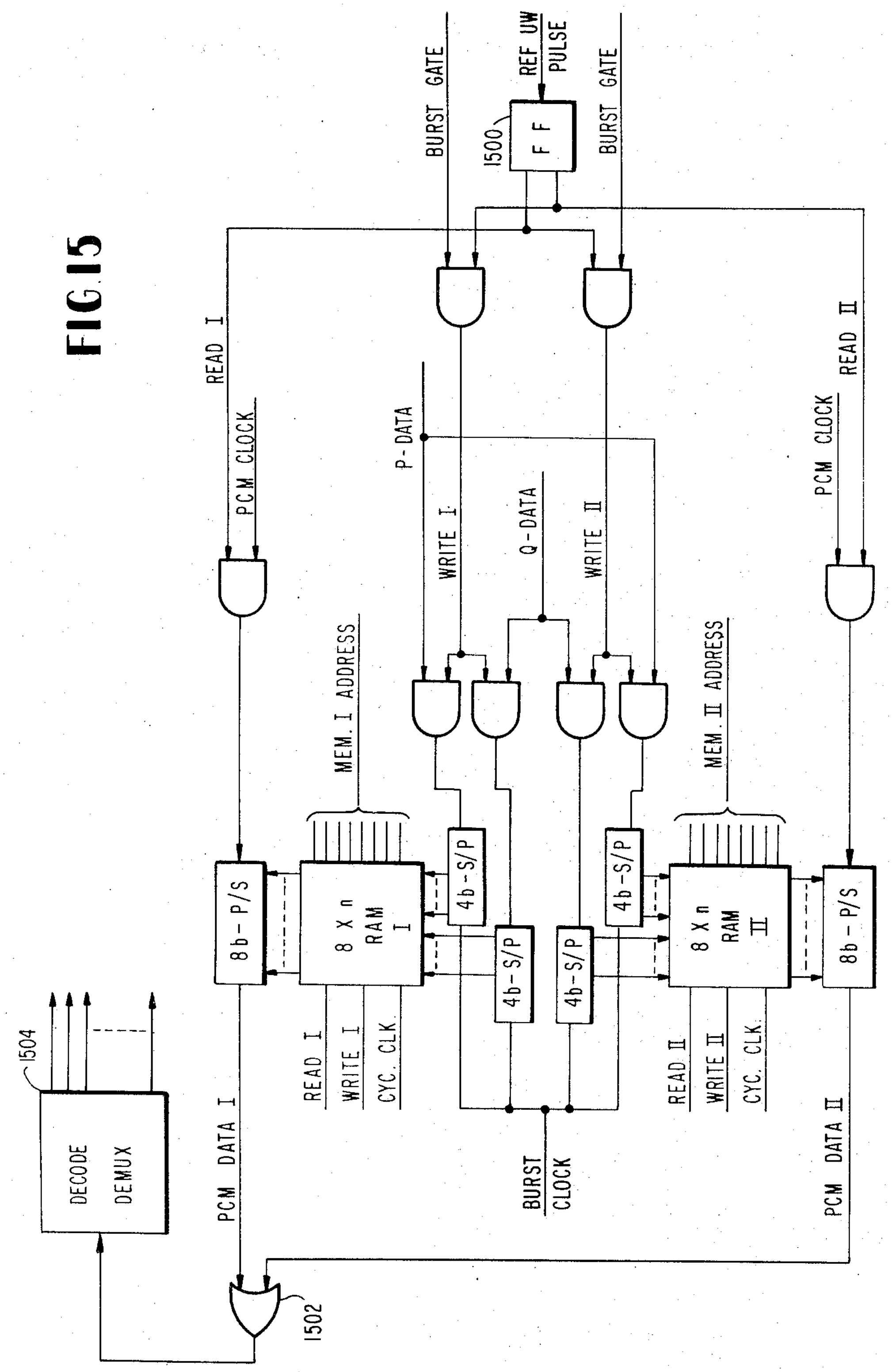
FIG. 15 is a block diagram of the receive side of the same terrestrial interface module which is partially shown in FIG. 14.

The receiver portion of the TIM unit, which receives the data in the interlaced PCM frame format and rearranges the data back into the original PCM format, is essentially the reverse of the system shown in FIG. 14. The receiver apparatus is illustrated in FIG. 15. In view of the description of FIG. 14 above and the understanding that the equipment in FIG. 15 operates in a reverse manner, the illustrated logic becomes apparent. In this case, the frame reference which toggles the flip-flop 1500 to reverse the read and write operations for the respective RAM I and RAM II memories, is toggled by the reference unique word pulse which is applied thereto by the associated timing unit in the demultiplexer (FIG. 10). Also, since the output must be continuous, the Read I and Read II control gates which alternate every 250 micro-seconds, have a duration equal to the TDMA frame length whereas the Write I and Write II control signals are only on for the duration of the burst gates which also comes from the same timing unit in the demultiplexer. The addressing means is identical to that in FIG. 14 with the exception that the read addressing means is stepped once every eight burst clock pulses. The continuous PCM data output from the OR gate 1502 is sent to a conventional means 1504 which operates to decode and demultiplex the voice data onto its proper channels.

Figure 16:
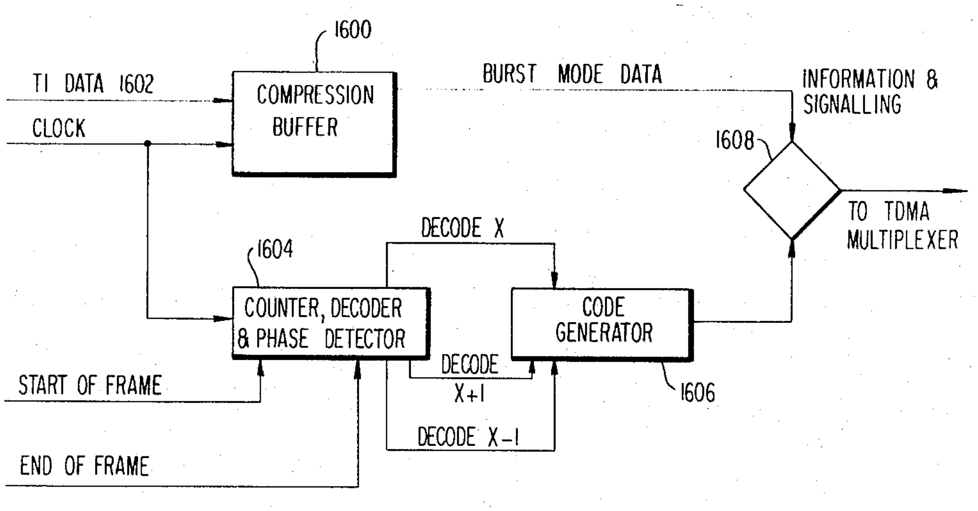
FIG. 16 is a block diagram of a pulse stuffing and burst forming apparatus at the transmitter.

There will now be described another novel terrestrial interface module as disclosed in FIGS. 16–21. Referring to FIG. 16 there is shown a block diagram of the pulse stuffing and burst forming apparatus used at the transmitter. Digital data from terrestrial input (TI) sources is fed into compression buffer 1600 via line 1602. The digital data is clocked into compression buffer 1600 at the terrestrial clock rate. As the digital data is clocked into compression buffer 1600, a counter, decoder and phase detector 1604 counts the number of clock pulse received within a frame interval. Counter, decoder and phase detector 1604 receives, from the TDMA multiplexer (not shown), a start of frame pulse and an end of frame pulse. Since there is one clock pulse per bit the number of clock pulses counter by counter, decoder and phase comparator 1604 equals the number of bits per frame fed into compression buffer 1600. If it is assumed, for purposes of explanation, that there is a 1 bit per frame asynchronous condition between the terrestrial system and the TDMA system, with the latter at the higher rate, then the counter of 1604 will have been instructed to count to $x$, wherein $x + 1$ = the number of TDMA bits/frame. Consequently, compression buffer 1600 will have stored therein $x$ bits for the frame interval.

At the end of frame interval the decoder of 1604 decodes a count of $x$ and forwards a pulse to code generator 1606. Code generator 1606 has an $n$-bit code stored therein which provides the receiver with information that $x$ bits are information bits. The size of the $n$-bit code (the pulse stuffing code) in generator 1606 depends on the probability of bit error in the TDMA transmission system and the requirement of the system for detecting the transmitted pulse stuffing code at the receiver, as would be well known.

When the TDMA multiplexer is ready to accept the contents of compression buffer 1600 for multiplexing with other data to form a burst of information for eventual transmission over the TDMA digital transmission system, the TDMA multiplexer sends a burst pulse to compression buffer 1600 and code generator 1606. In response to this burst pulse the code generator 1606 outputs the pulse stuffing code while the compression buffer 1600 outputs its data. The pulse stuffing code and digital data are then multiplexed in information and signaling multiplexer 1608. The digital data from compression buffer 1600 and the pulse stuffing code from code generator 1606 are clocked out by the TDMA multiplexer clock. The serial bit stream of a pulse stuffing code followed by the digital data is then forwarded to the TDMA multiplexer for transmission over the TDMA digital transmission system to the receiver of FIG. 17. As will be hereinafter discussed, the digital data fed to multiplexer 1608, which is now in burst format, will comprise 1 extra bit at the end of the data stream (or at the beginning of the data stream whichever is predetermined) as the "stuffed" bit.

Figure 17:
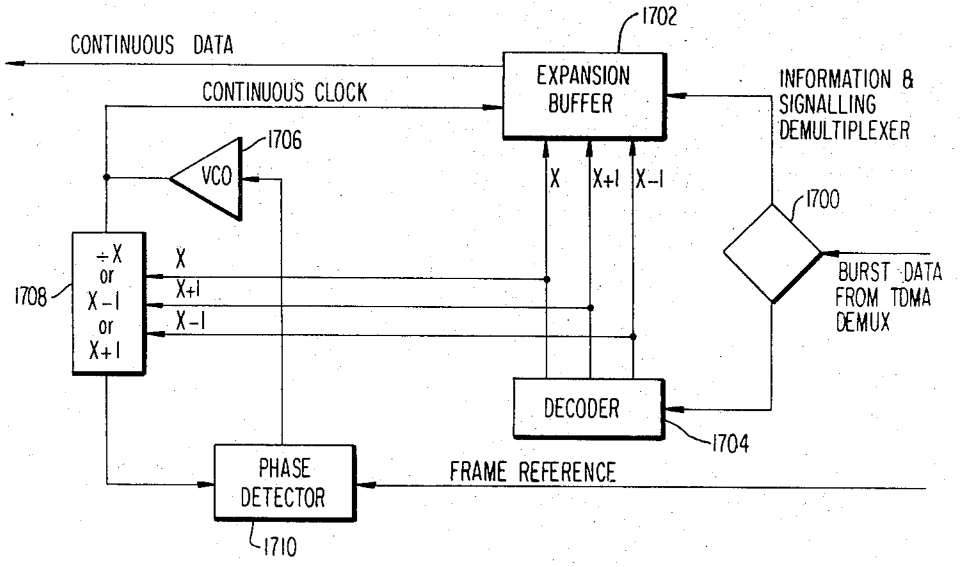
FIG. 17 is a block diagram of apparatus at a receiver for converting the data from burst forms to continuous form and for pulse destuffing.

Referring to FIG. 17, there is shown the apparatus for converting the data from burst to continuous form and for pulse destuffing. After being de-multiplexed in the TDMA frame demultiplexer (not shown) of the receiver, the serial bit stream comprising the pulse stuffing code and the digital information including the "stuffed" bit is fed to information and signaling demultiplexer 1700. Demultiplexer 1700 then feeds the digital information to expansion buffer 1702 and the pulse stuffing code to decoder 1704. Decoder 1704 decodes the pulse stuffing code which provides information concerning the number of information bits transmitted during the burst and enables the information bits to be written into expansion buffer 1702 but blocks the stuffed pulse from being written into buffer 1702.

The data stored in the expansion buffer 1702 is then read out of the buffer at a continuous data rate by the continuous clock provided by voltage controlled oscillator (VCO) 1706. The VCO 1706 is controlled by a phase detector 1710 which receives and compares two inputs: the frame reference input and the input from the clock divider 1708. Phase detector 1710 compares the time of reception of the frame reference pulse with the input from divider 1708. The output of VCO 1706 is shifted by phase detector 1710 if a predetermined difference in time of reception between the frame reference pulse and the input pulse of divider 1708 is not detected. In this manner it is assured that the expansion buffer 1702 output information rate is matched to the input information rate (data rate minus stuff rate).

It has been assumed in the discussion thus far, for purposes of explanation, that the difference in data rate between the terrestrial input data and the TDMA output data from compression buffer 1600 will vary by 1 bit per frame period, worst case, thereby necessitating transmission of a pulse stuffing bit and a pulse stuffing code each burst. However, in actuality, the difference in data rates may vary only slightly such that the data rates may be asynchronous by only one full bit per eight frames in the worst case, for example. If this latter example is assumed, then a pulse stuffing bit need not be transmitted with each burst nor need there be transmitted a pulse stuffing code word with each burst. A method of operation may then be to distribute an 8-bit pulse stuffing code word (assuming the reliability of an 8-bit code word is adequate for system requirements) over an eight frame period and transmit the pulse stuffing bit during the eighth frame. The receiver would receive and store the pulse code stuffing bits and, during the eighth frame, would be ready to decode the complete pulse stuffing code word and process the "stuffed" bit. The distributed pulse stuffing code word technique will now be described in more detail.

Figure 18:
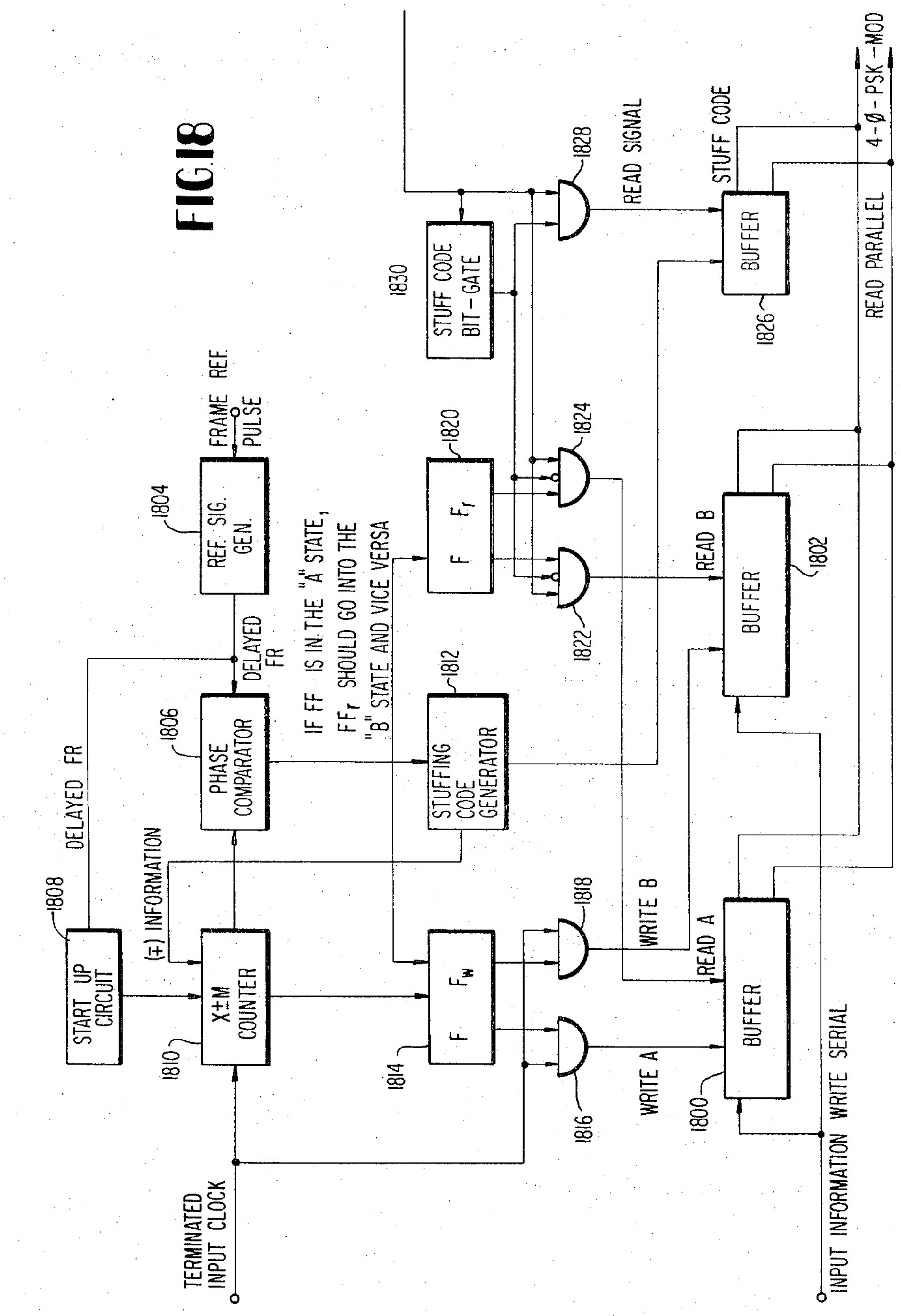
FIG. 18 is a schematic diagram of the apparatus of FIG. 16.
Figure 19:
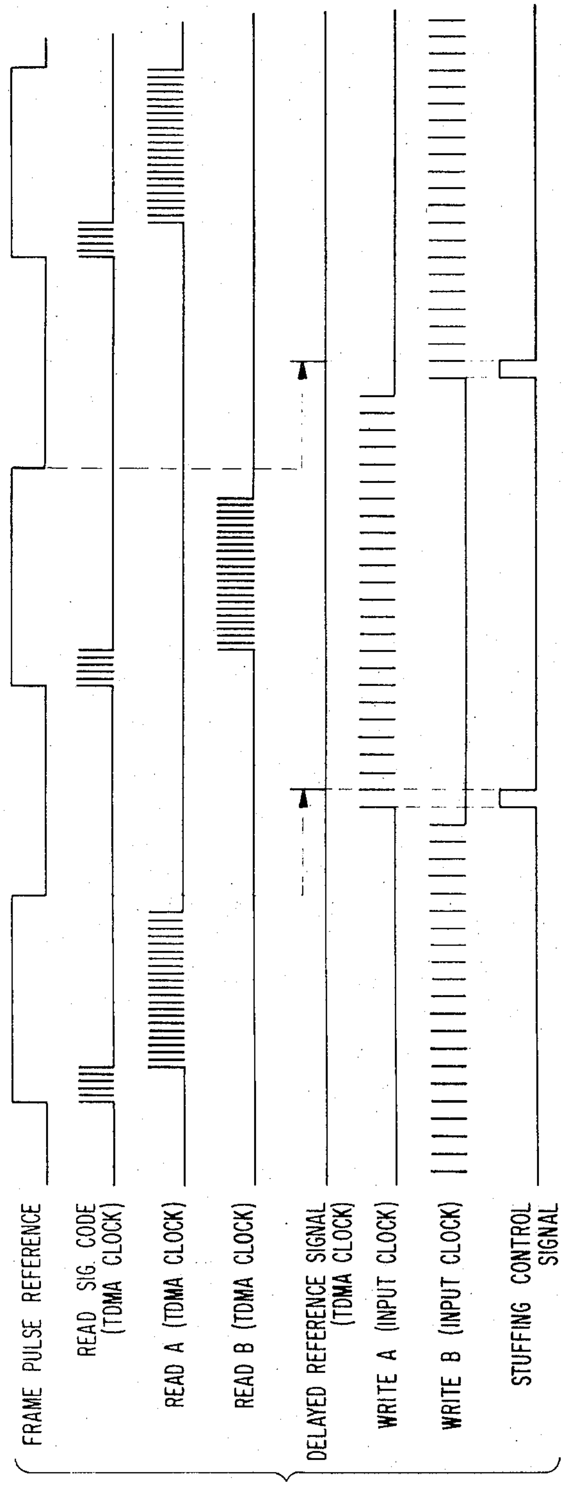
FIG. 19 is a timing diagram for the apparatus of FIG. 18.
Figure 21:
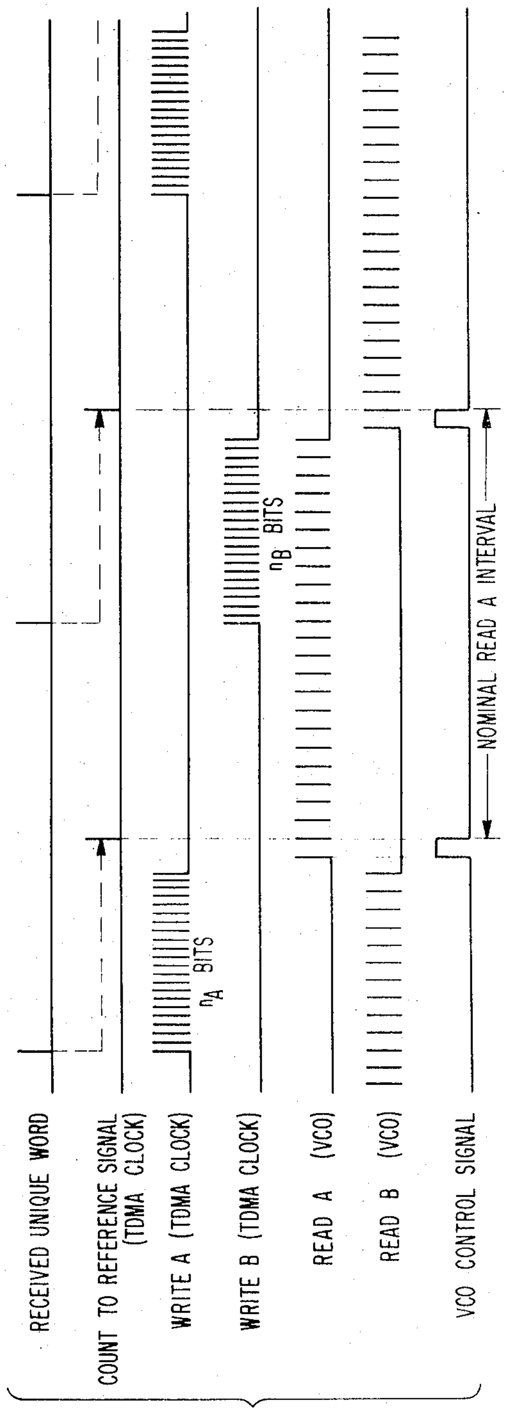
FIG. 21 is a timing diagram for the apparatus of FIG. 20.

Referring to FIG. 18 there is shown a schematic diagram of the apparatus of FIG. 16. There is shown in FIG. 18 a first compression buffer 1800 and a second compression buffer 1802. These two compression buffers comprise compression buffer 1600 shown in FIG. 16 and are required to enable data to be written into one buffer while data, written into the second buffer during the previous frame interval, is read out of the second buffer.

A frame reference (FR) pulse indicating the start of frame is received from the burst synchronizer (not shown) and sent to reference signal generator 1804. The reference signal generator 1804 delays the frame reference pulse a predetermined period of time (for reasons hereinafter stated) and then outputs the pulse to phase comparator 1806 and start-up circuit 1808. In response to the first frame reference pulse, start-up circuit 1808 resets the counter 1810. Counter 1810 then commences counting the input clock pulses from the terrestrial clock source. Counter 1810 may count, in a frame interval, clock pulses equal to $x \pm m$ which are the number of clock pulses (equal to data bits) received. The number of clock pulses which counter 1810 will count in a frame interval is determined by the pulse stuffing code as will be later described. For purposes of explanation, if it is assumed the pulse stuffing code word set counter 1810 to count to $x$ number of clock pulses, then at the end of this count a pulse will be emitted to phase comparator 1806. Phase comparator 1806 will also receive the delayed frame reference pulse from reference signal generator 1804 which commences the start of the next frame interval and indicates the end of the present frame interval.

In the distributed pulse stuffing code example, if it is now assumed the terrestrial digital clock is in the worst case 1 full bit time faster per eight TDMA frames than the average TDMA clock, then the output of counter 1810 will arrive at phase comparator 1806 a fraction of a bit time earlier than the delayed frame reference pulse from reference signal generator 1804. Consequently, in response to detection of this fraction of a bit time difference, phase comparator 1806 will emit a pulse instructing stuffing code generator 1812 to generate an 8-bit pulse stuffing code. The 8-bit pulse stuffing code is then fed to stuff code buffer 1826.

For a period of seven frames compression buffers 1800 and 1802 are alternately writing in and reading out bursts of data comprising $x$ information bits. The data that is read out of the respective compression buffers 1800 and 1802 is transmitted in burst form with each of the seven bursts including 1 bit of the distributed pulse stuffing code word.

The manner in which data is written into and read out of the compression buffers as well as the manner in which 1 bit of the pulse stuffing code is multiplexed with the information bits will now be described with relation to the writing in and reading out of data for the eighth frame, which will also include the "stuffed" pulse. At the start of the eighth frame stuffing code generator 1812 instructs counter 1810 to count to $x+1$. When counter 1810 starts to count during the eighth frame a pulse counter 1810 is fed to flip-flop 1814 which switches states to enable the writing in of data to compression buffer 1800, for example. During the previous frame interval flip-flop 1814 was in the other state enabling the writing of data to compression buffer 1802.

When flip-flop 1814 changes state it sends an enabling pulse to AND gate 1816 which is also receiving, as the other enabling pulse, the terrestrial input clock pulses. AND gate 1816 is thereby enabled to write into compression buffer 1800 the terrestrial input data. Gate 1816 will be enabled until counter 1810 reaches a count of $x+1$ and is reset which in turn causes flip-flop 1814 to switch states and commence writing data into compression buffer 1802 via an enabling pulse from AND gate 1818. Therefore, compression buffer 1800 will be enabled to write in $x+1$ information bits at the continuous, terrestrial clock rate. As can be seen from the timing diagram of FIG. 19 the delayed frame reference (FR) pulse is required to eliminate the simultaneous writing and reading of the same buffer.

To read out $x+1$ bits from the compression buffer 1800, during the next frame interval counter 1810 will be counting to $x+1$ and will have caused flip-flop 1814 to switch states and write data into compression buffer 1802. Consequently, flip-flop 1820 will switch states and enable AND gate 1824. Also AND gate 1828 will receive enabling pulses from the TDMA burst clock and stuff code bit gate 1830. Stuff code bit gate 1830 emits an enabling pulse one bit time each burst period which enables gate 1828 and inhibits AND gate 1824. During this one bit time the eighth bit stored in stuff code buffer 1826 is read out. Then, for the remainder of the frame interval stuff code bit gate 1830 does not emit an enabling pulse. During this time AND gate 1824 is enabled via the TDMA burst clock, flip-flop 1820 and the invert pulse from stuff code bit gate 1830 to read out $x+1$ bits from compression buffer 1800 at the TDMA clock rate. The burst including, in series, one bit of the distributed pulse stuff code and $x+1$ bits of information is then fed to a modulator (not shown) and transmitted over the TDMA system. If the data timing asynchronism had been of opposite polarity, $x+1$ bits would still be sent in the TDMA channel but only $x$ or $x-1$ bits would be information and 1 or 2 bits would be dummy bits.

Figure 20:
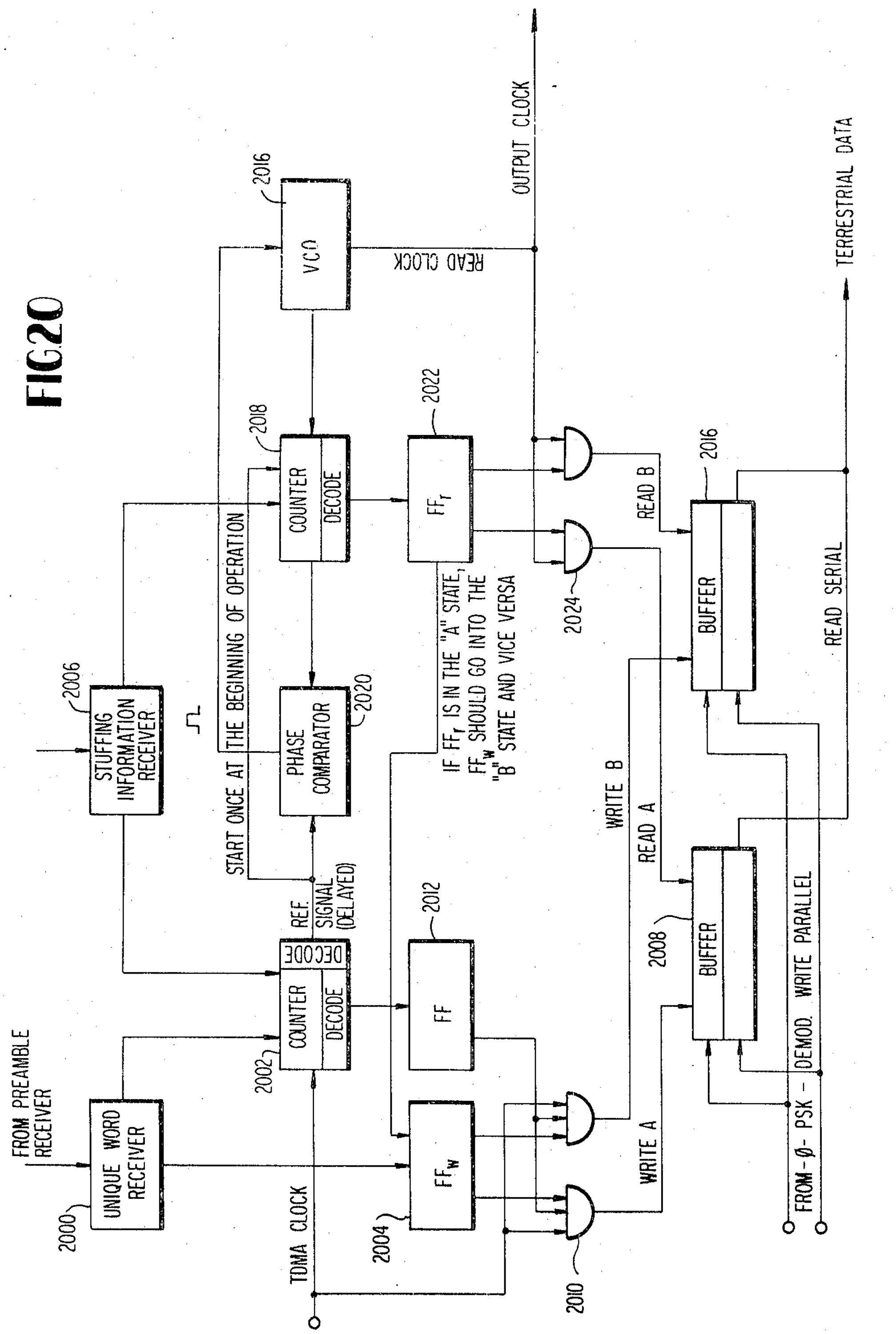
FIG. 20 is a schematic diagram of the apparatus of FIG. 17.

Referring to FIG. 20 there is shown therein a schematic diagram of the apparatus of FIG. 17. The discussion will assume as an example the "eighth" frame containing the "stuffed" pulse is being received though the operation of this apparatus will be basically the same for all received frames. When the frame is received timing information for the burst in the form of a unique word is fed from the unique word receiver 2000 to counter and decoder 2002 and flip-flop 2004. The unique word receiver emits a pulse which enables the counter and decoder 2002 to commence counting. The pulse stuffing information code bit which follows in series with the unique word is forwarded to the stuffing information receiver 2006 which, in turn, forwards the entire pulse stuffing code to the counter and decoder 2002. Counter 2002 counts at the TDMA clock rate to a number defined by the stuffing information code which, in the present example, would be $x+1$.

While counter 2002 is counting, the burst data is written into expansion buffer 2008, for example, in the following manner. The unique word sets flip-flop 2004 to enable gate 2010. Gate 2010 also receives enabling pulses from the TDMA clock and flip-flop 2012. Gate 2010 thereby emits a write enable pulse to expansion buffer 2008 which writes in the burst data. When counter 2002 has counted to $x+1$ the counter decodes the count and sends a reference signal to phase comparator 2020 and a pulse to flip-flop 2012. Flip-flop 2012 then removes its enabling pulse to gate 2010 thereby ceasing the writing in of data into expansion buffer 2008. While buffer 2008 is writing in the data of present burst, expansion buffer 2014 is reading out the data of the previous burst at the continuous, terrestrial clock rate provided by the voltage controlled oscillator (VCO), 2016.

The pulse stuffing code word is also forwarded to counter and decoder 2018. Counter and decoder 2018 counts at the terrestrial, data rate provided by the VCO 2016. When counter 2002 and 2018 have reached the count defined by the pulse stuffing code word the count is decoded and each counter emits a pulse to phase comparator 2020. The pulse from counter 2002 is actually delayed a predetermined period for the same reasons the frame reference pulse at the transmitter was delayed. Counter 2018 also emits a pulse to flip-flop 2022 which causes flip-flop 2022 to change state and commence reading out the data from compression buffer 2008 at the terrestrial clock rate. Expansion buffer 2008 is enabled through AND gate 2024 which is enabled by the flip-flop 2022 and VCO 2016 read clock pulses.

Phase comparator 2020 emits a pulse to control the VCO 2016 output rate if the two input signals applied to the phase comparator are not in phase. The output rate of VCO 2016 is adjusted to enable the synchronous reading out of the data stored in expansion buffer 2008. As can be seen from the timing diagram of FIG. 21, if the output pulses from counter 2002 and 2018 are not in phase a stuffing control signal will be generated to correct the VCO 2016 output frequency which shifts the phase of counter 2018 output pulse.

The discussion has been based on an example of an 8-bit distributed pulse stuffing code word for a 1 bit per eight TDMA frame asynchronous condition though the invention is not to be so limited. As another example, if the asynchronous condition is 1 bit/13 TDMA frames and the TDMA system requires a pulse stuffing code word of 19 bits to assure reliable reception an approach may be to distribute 2 bits at a time over 13 frames. This would solve the asynchronous problem and provide a greater reliability of reception of the pulse stuffing word due to its 26-bit length, in lieu of the 19 bit code minimum requirement. Any combination of asynchronism and stuff code word reliability can be accommodated.

The above description related to the technique of employing a distributed pulse stuffing code. However, it may be desired to employ the technique of stuffing each frame period, which would require the transmission each frame of a complete pulse stuffing code word. To do this, counter 1810 would be updated each frame period to count to $x$ or $x+m$ bits each frame period depending on the phase relationship in phase comparator 1806 between counter 1810 and reference signal generator 1804. In addition, all the bits of the pulse stuffing code stored in stuff code buffer 1826 would be read out each frame period. Stuff code bit gate 1830 would be programmed to emit the number of enabling pulses to gate 1828 necessary to read out of buffer 1826 the number of bits in the pulse stuffing code word. At the receiver the counters and decoders 2002 and 2018 would be updated every frame period to write in and read out of respective expansion buffers 2008 and 2014 the number of bits stored therein in accordance with the information provided by the pulse stuffing code.

Specific logic for performing various functions such as the phase comparing function of phase comparator 1806 and 2020 or the generating of a stuffing code by stuffing code generator 1812 would be known to one skilled in the art.

We claim:

1. In a TDMA satellite communication system of the type wherein multiple earth stations transmit their respective data during transmission bursts which arrive at a satellite transponder at non-overlapping times, a repetitive group of said bursts comprising a TDMA transponder frame, and wherein synchronization is maintained by comparing the time separation between a station's burst and a frame reference to a known time difference and slightly altering a frame counter that controls the timing of burst transmission to cause it to recycle at an earlier or later count to decrease the difference between said time separation and said known time difference, the improvement being a system for rapidly reestablishing synchronization comprising, a. first means for periodically monitoring the time difference, $\Delta T$, between the detection of said frame reference and some predetermined state of said frame counter, b. second means for periodically calculating and storing the rate of change of $\Delta T$, c. third means for monitoring outages in said earth station equipment and for signaling the beginning and end of an outage, d. calculator means connected to said first, second and third means for calculating the expected time separation of said frame reference and said predetermined state at end of said outage, and e. means for setting a number in said frame counter based on the calculation by said calculator means to provide a time separation, $\Delta T$, equal to said expected time separation, following the termination of said outage.

2. A TDMA system as claimed in claim 1 wherein said calculator means comprises, a. a battery operated source of clock pulses, b. counting means responsive to said third means for accumulating said clock pulses during said outage, c. multiplier means for multiplying the time accumulated by said counting means by the last calculated rate of change in $\Delta T$, d. summation means for algebraically adding the product formed by said multiplying means by the last monitored time difference to form a new predicted time difference $\Delta T \pm S$, and e. means for presetting said frame counter to provide a time difference between the first frame reference following said outage and said predetermined state of said counter which equals said predicted time difference.

3. A TDMA system as claimed in claim 2 wherein said presetting means comprises, a. means for subtracting said predicted time difference, $\Delta T \pm S$, from N, where N is the number of increments nominally counted by said frame counter each cycle of said frame counter, and b. means responsive to the first occurring frame reference following said outage for presetting the count of $[N-(\Delta T \pm S)]$ into said frame counter.

4. A TDMA system as claimed in claim 1 wherein the outage is a power transient and said third means is a means for monitoring power transients.

5. A TDMA system as claimed in claim 2 wherein said outage is a power transient and said third means is a means for monitoring power transients.

* * * * *

UNITED STATES PATENT OFFICE
CERTIFICATE OF CORRECTION

Patent No. 3,778,715 Dated December 11, 1973

Inventor(s) WILLIAM G. SCHMIDT ET AL

It is certified that error appears in the above-identified patent and that said Letters Patent are hereby corrected as shown below:

IN THE SPECIFICATION:

Column 8

Line 28, delete "pluarlity" and insert --plurality--

Column 11

Line 11, delete "hereinafter" and insert --hereafter--

Column 15

Line 38, delete "1110" and insert --1100--

Line 53, delete "and" (second occurrence)

Column 25

Line 24, after "coding," insert --and--

Line 51, after "frames" delete --,--

Column 27

Line 47, delete "1362" and insert --1462--

Column 32

Line 58, delete "x + m" and insert --x $\pm$ m--

Signed and sealed this 22nd day of October 1974.

(SEAL)
Attest:

McCOY M. GIBSON JR.
Attesting Officer

C. MARSHALL DANN
Commissioner of Patents